(12) United States Patent
Kim et al.

(10) Patent No.: US 12,525,396 B2
(45) Date of Patent: Jan. 13, 2026

(54) MULTILAYER CERAMIC CAPACITOR

(71) Applicant: SAMSUNG ELECTRO-MECHANICS CO., LTD., Suwon-si (KR)

(72) Inventors: Seonho Kim, Suwon-si (KR); Chae Min Park, Suwon-si (KR); Yong-Won Seo, Suwon-si (KR); Youngjun Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 83 days.

(21) Appl. No.: 18/419,026

(22) Filed: Jan. 22, 2024

(65) Prior Publication Data
US 2024/0304383 A1    Sep. 12, 2024

(30) Foreign Application Priority Data

Mar. 10, 2023  (KR) .................. 10-2023-0031802
Aug. 31, 2023  (KR) .................. 10-2023-0115106

(51) Int. Cl.
*H01G 4/005* (2006.01)
*H01G 4/12* (2006.01)

(52) U.S. Cl.
CPC ............... *H01G 4/005* (2013.01); *H01G 4/12* (2013.01)

(58) Field of Classification Search
CPC .......... H01G 4/005; H01G 4/30; H01G 4/012; H01G 4/232; H01G 4/12
USPC ............. 361/301.4, 303, 306.3, 321.1, 321.3
See application file for complete search history.

(56) References Cited

U.S. PATENT DOCUMENTS

| | | | |
|---|---|---|---|
| 11,443,898 B2* | 9/2022 | Trinh | H01G 4/012 |
| 2009/0154055 A1* | 6/2009 | Takashima | H01G 4/30 |
| | | | 361/301.4 |
| 2009/0161293 A1* | 6/2009 | Takeuchi | H01G 4/005 |
| | | | 361/321.2 |
| 2012/0019978 A1 | 1/2012 | Yoshida | |

(Continued)

FOREIGN PATENT DOCUMENTS

| | | |
|---|---|---|
| EP | 4428880 A2 | 9/2024 |
| EP | 4443450 A2 | 10/2024 |

(Continued)

OTHER PUBLICATIONS

The Extended European Search Report dated Jan. 27, 2025 issued in European Patent Application No. 24161319.9.

*Primary Examiner* — Arun Ramaswamy
(74) *Attorney, Agent, or Firm* — Morgan Lewis & Bockius LLP

(57) ABSTRACT

A multilayer ceramic capacitor having a thickness smaller than a width thereof includes: a ceramic main body including first and second surfaces opposite to each other in a first direction, third and fourth surfaces opposite to each other in a second direction, fifth and sixth surfaces opposite to each other in a third direction: a first cover layer including a first dummy electrode pattern adjoining to an internal electrode closest to the fifth surface among the plurality of first and second internal electrodes; and a second cover layer including a second dummy electrode pattern adjoining to an internal electrode closest to the sixth surface among the plurality of first and second internal electrodes.

21 Claims, 15 Drawing Sheets

(56) References Cited

U.S. PATENT DOCUMENTS

| | | | |
|---|---|---|---|
| 2012/0019982 A1* | 1/2012 | Sasaki | H01G 4/002 |
| | | | 361/321.1 |
| 2012/0073129 A1 | 3/2012 | Abe et al. | |
| 2015/0096795 A1* | 4/2015 | Hong | H01G 2/065 |
| | | | 361/301.4 |
| 2015/0318110 A1 | 11/2015 | Lee et al. | |
| 2017/0178809 A1* | 6/2017 | Nishisaka | H01G 4/30 |
| 2019/0157004 A1* | 5/2019 | Park | H01G 4/232 |
| 2019/0287720 A1* | 9/2019 | Mori | H01G 4/232 |
| 2020/0027658 A1* | 1/2020 | Lee | H01G 4/012 |
| 2020/0118758 A1* | 4/2020 | Kim | H01G 4/30 |
| 2020/0118760 A1 | 4/2020 | Jun et al. | |
| 2020/0152382 A1 | 5/2020 | Sakurai et al. | |
| 2024/0304386 A1 | 9/2024 | Kim et al. | |
| 2024/0331940 A1 | 10/2024 | Park et al. | |

FOREIGN PATENT DOCUMENTS

| | | |
|---|---|---|
| JP | 2012-044148 A | 3/2012 |
| JP | 2013-093374 A | 5/2013 |
| JP | 2020-167367 A | 10/2020 |
| KR | 10-2005-0093879 A | 9/2005 |

\* cited by examiner

MULTILAYER CERAMIC CAPACITOR

CROSS-REFERENCE TO RELATED APPLICATION

This application claims priority to and the benefit of Korean Patent Application No. 10-2023-0031802 filed in the Korean Intellectual Property Office on Mar. 10, 2023, and Korean Patent Application No. 10-2023-0115106 filed in the Korean Intellectual Property Office on Aug. 31, 2023, the entire contents of which are incorporated herein by reference.

BACKGROUND

The present disclosure relates to a multilayer ceramic capacitor.

Electronic components, which use ceramic materials, include capacitors, inductors, piezoelectric elements, varistors, thermistors, or the like. Among these ceramic electronic components, a multilayer ceramic capacitor (MLCC) small in size, ensures a high capacity, and is easy to mount. Therefore, the multilayer ceramic capacitor may be used for various electronic devices.

For example, the multilayer ceramic capacitors may be used for chip-shaped condensers mounted on boards of various electronic products such as imaging devices such as liquid crystal display (LCD) devices, plasma display panel (PDP) devices, and organic light-emitting diodes (OLEDs), computers, personal portable terminals, and smartphones and configured to charge the electronic products with electricity or discharge the electronic products.

With the recent trend toward small-scaled and thinned electronic products, there has been an increasing demand for multilayer ceramic capacitors having smaller thicknesses than multilayer ceramic capacitors in the related art. In particular, because a multilayer ceramic capacitor, which is thinned to the extent that a width thereof is 1.5 times or 2 times or more of a thickness thereof, has a thickness significantly smaller than a width, there is a risk of physical damage such as a flex crack occurring when a board is bent after the multilayer ceramic capacitor is mounted on the board.

An external electrode may partially cover two opposite end surfaces of a ceramic main body to thin the multilayer ceramic capacitor. However, it may be difficult to implement the thinned multilayer ceramic capacitor when an area in which the external electrode is formed is too large.

Meanwhile, flatness may deteriorate when a level difference is present between an active area and a margin area of the multilayer ceramic capacitor.

SUMMARY

The present disclosure has been made in an effort to provide a multilayer ceramic capacitor that may reduce the likelihood of the occurrence of a flex crack.

The present disclosure has also been made in an effort to provide a multilayer ceramic capacitor capable of adjusting an area in which an external electrode is formed.

The present disclosure has also been made in an effort to provide a multilayer ceramic capacitor with improved flatness.

However, the object to be achieved by the embodiments of the present disclosure is not limited to the above-mentioned object but may be variously expanded without departing from the technical spirit of the present disclosure.

An embodiment of the present disclosure provides a multilayer ceramic capacitor including: a ceramic main body having a thickness smaller than a width thereof, including: first and second surfaces opposite to each other in a first direction; third and fourth surfaces opposite to each other in a second direction; fifth and sixth surfaces opposite to each other in a third direction; a plurality of dielectric layers; a plurality of first internal electrodes; a plurality of second internal electrodes stacked in the third direction; a first external electrode disposed on the first surface of the ceramic main body and connected to the plurality of first internal electrodes; a second external electrode disposed on the second surface of the ceramic main body and connected to the plurality of second internal electrodes; a first cover layer including a first dummy electrode pattern and configured to adjoin an internal electrode closest to the fifth surface among the plurality of first and second internal electrodes; and a second cover layer including a second dummy electrode pattern and configured to adjoin an internal electrode closest to the sixth surface among the plurality of first and second internal electrodes.

In addition, the first dummy electrode pattern may include: a first dummy electrode configured to adjoin the first surface or be drawn out to the first surface; and a second dummy electrode configured to adjoin the second surface or be drawn out to the second surface.

In addition, the ceramic main body may include: an active area that is an area in which the plurality of first internal electrodes and the plurality of second internal electrodes overlap one another in the third direction; a first margin area that is an area between the active area and the first surface of the ceramic main body; and a second margin area that is an area between the active area and the second surface of the ceramic main body, a length L1 of the first dummy electrode may be equal to or larger than a width L2 of the first margin area, and a length L1' of the second dummy electrode may be equal to or larger than a width L2' of the second margin area.

In addition, the second dummy electrode pattern may include: a third dummy electrode configured to adjoin the first surface or be drawn out to the first surface; and a fourth dummy electrode configured to adjoin the second surface or be drawn out to the second surface, a length L3 of the third dummy electrode may be equal to or larger than a width L2 of the first margin area, and a length L3' of the fourth dummy electrode may be equal to or larger than a width L2' of the second margin area.

In addition, the second cover layer may include a first exposed surface, which is a portion of the first surface exposed by the first external electrode, and a second exposed surface, which is a portion of the second surface exposed by the second external electrode, and the second dummy electrode pattern may include: a third dummy electrode spaced apart from the first exposed surface; and a fourth dummy electrode spaced apart from the second exposed surface.

In addition, the second cover layer may include a first exposed surface, which is a portion of the first surface exposed by the first external electrode, and a second exposed surface, which is a portion of the second surface exposed by the second external electrode, and the second dummy electrode pattern may include: a third dummy electrode configured to adjoin the first exposed surface or extended to the first exposed surface; and a fourth dummy electrode configured to adjoin the second exposed surface or extended to the second exposed surface.

In addition, the first dummy electrode pattern may include: a first dummy electrode spaced apart from the first surface; and a second dummy electrode spaced apart from the second surface.

In addition, the second cover layer may include a first exposed surface, which is a portion of the first surface exposed by the first external electrode, and a second exposed surface, which is a portion of the second surface exposed by the second external electrode, and the second dummy electrode pattern may include: a third dummy electrode spaced apart from the first exposed surface; and a fourth dummy electrode spaced apart from the second exposed surface.

In addition, a length L1 of the first dummy electrode may be equal to or larger than a width L2 of the first margin area, and a length L1' of the second dummy electrode may be equal to or larger than a width L2' of the second margin area.

In addition, a length L3 of the third dummy electrode may be equal to or larger than the width L2 of the first margin area, and a length L3' of the fourth dummy electrode may be equal to or larger than the width L2' of the second margin area.

In addition, the second cover layer may include a first exposed surface, which is a portion of the first surface exposed by the first external electrode, and a second exposed surface, which is a portion of the second surface exposed by the second external electrode, and the second dummy electrode pattern may include: a third dummy electrode configured to adjoin the first exposed surface or be drawn out to the first exposed surface; and a fourth dummy electrode configured to adjoin the second exposed surface or be drawn out to the second exposed surface.

In addition, the second cover layer may include a first exposed surface, which is a portion of the first surface exposed by the first external electrode, and a second exposed surface, which is a portion of the second surface exposed by the second external electrode, a height H1 of the first exposed surface may be smaller than a thickness t of the second cover layer, and a height H2 of the second exposed surface may be smaller than the thickness t of the second cover layer.

In addition, the first external electrode may include a first band portion disposed on the fifth surface of the ceramic main body, the second external electrode may include a second band portion disposed on the fifth surface of the ceramic main body, and the multilayer ceramic capacitor may further include a first seed electrode layer disposed between the first band portion and the fifth surface, and a second seed electrode layer disposed between the second band portion and the fifth surface.

In addition, a length L1 of the first dummy electrode may be smaller than a length L4 of the first band portion, and a length L1' of the second dummy electrode may be smaller than a length L4' of the second band portion.

In addition, a length L3 of the third dummy electrode may be smaller than a length L4 of the first band portion, and a length L3' of the fourth dummy electrode may be smaller than a length L4' of the second band portion.

In addition, the ceramic main body may include: an active area that is an area in which the plurality of first internal electrodes and the plurality of second internal electrodes overlap one another in the third direction; a first margin area that is an area between the active area and the first surface of the ceramic main body; and a second margin area that is an area between the active area and the second surface of the ceramic main body, a length L1 of the first dummy electrode may be equal to or larger than a width L2 of the first margin area, and a length L1' of the second dummy electrode may be equal to or larger than a width L2' of the second margin area.

In addition, a length L3 of the third dummy electrode may be equal to or larger than the width L2 of the first margin area, and a length L3' of the fourth dummy electrode may be equal to or larger than the width L2' of the second margin area.

In addition, at least one of the first dummy electrode, the second dummy electrode, the third dummy electrode, and the fourth dummy electrode may be plural in number.

In addition, the ceramic main body may include: an active area that is an area in which the plurality of first internal electrodes and the plurality of second internal electrodes overlap one another in the third direction; a first margin area that is an area between the active area and the first surface of the ceramic main body; and a second margin area that is an area between the active area and the second surface of the ceramic main body, and a sum S1 of thicknesses of the plurality of first internal electrodes and the plurality of second internal electrodes in the active area may be larger than 0 and equal to or smaller than twice a sum S2 of thicknesses of the first dummy electrode pattern and the second dummy electrode pattern.

In addition, the thickness of the ceramic main body may be larger than 0 and equal to or smaller than 80% of the width.

In addition, the plurality of first internal electrodes and the plurality of second internal electrodes may each have a rectangular shape including first and second long sides facing each other and first and second short sides facing each other when viewed in the third direction, the first short side of the first internal electrode may be connected to the first external electrode, and the first short side of the second internal electrode may be connected to the second external electrode.

In addition, the plurality of first internal electrodes and the plurality of second internal electrodes may each have a rectangular shape including first and second long sides facing each other and first and second short sides facing each other when viewed in the third direction, the first long side of the first internal electrode may be connected to the first external electrode, and the first long side of the second internal electrode may be connected to the second external electrode.

According to the multilayer ceramic capacitor according to the embodiment, it is possible to suppress the occurrence of the flex crack by disposing the dummy electrode at the portion where stress is concentrated at the time of mounting the multilayer ceramic capacitor on the circuit board.

In addition, according to the multilayer ceramic capacitor according to the embodiment, it is possible to improve the flatness by suppressing the occurrence of the level difference between the active area and the margin area by disposing the dummy electrode in the margin area.

In addition, according to the multilayer ceramic capacitor according to the embodiment, it is possible to adjust an area, in which the external electrode is formed, by plating the external electrode using the end of the internal electrode of the ceramic main body as a seed.

DETAILED DESCRIPTION OF THE EMBODIMENTS

Figure 1:
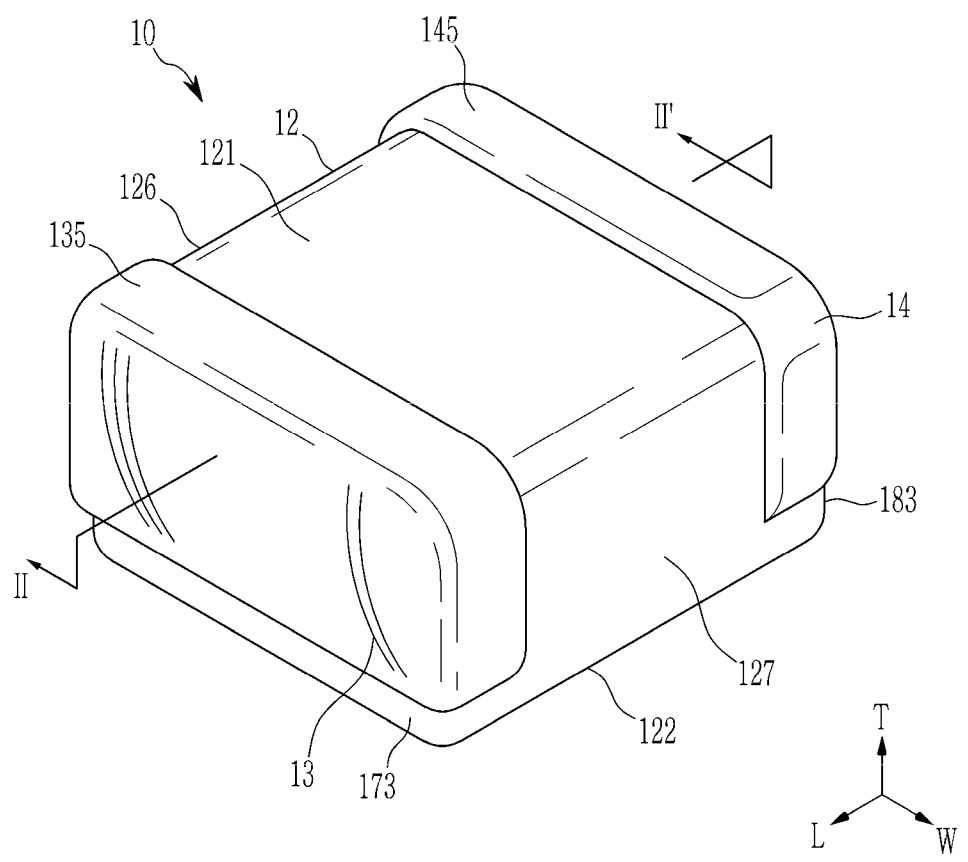
FIG. 1 is a perspective view schematically illustrating a multilayer ceramic capacitor according to the embodiment.

Hereinafter, embodiments of the present disclosure will be described in detail with reference to the accompanying drawings so that those with ordinary skill in the art to which the present disclosure pertains may easily carry out the embodiments. In the drawings, a part irrelevant to the description will be omitted to clearly describe the present disclosure, and the same or similar constituent elements will be designated by the same reference numerals throughout the specification. Some constituent elements in the accompanying drawings are illustrated in an exaggerated or schematic form or are omitted. A size of each constituent element does not entirely reflect an actual size.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

In addition, when one component such as a layer, a film, an area, or a plate is described as being positioned "above" or "on" another component, one component can be positioned "directly on" another component, and one component can also be positioned on another component with other components interposed therebetween. On the contrary, when one component is described as being positioned "directly above" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Throughout the specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof. Therefore, unless explicitly described to the contrary, the word "comprise/include" and variations such as "comprises/includes" or "comprising/including" will be understood to imply the inclusion of stated elements, not the exclusion of any other elements.

In addition, throughout the specification, the phrase "in a plan view" means when an object is viewed from above, and the phrase "in a cross-sectional view" means when a cross section made by vertically cutting an object is viewed from a lateral side.

In addition, throughout the specification, when one constituent element is referred to as being "connected to" another constituent element, one constituent element can be "directly connected to" the other constituent element, and one constituent element can also be "indirectly connected to," "physically connected to," or "electrically connected to" the other element with other elements therebetween. Further, the constituent elements are defined as different names according to positions or functions thereof, but the constituent elements may be integrated.

Figure 2:
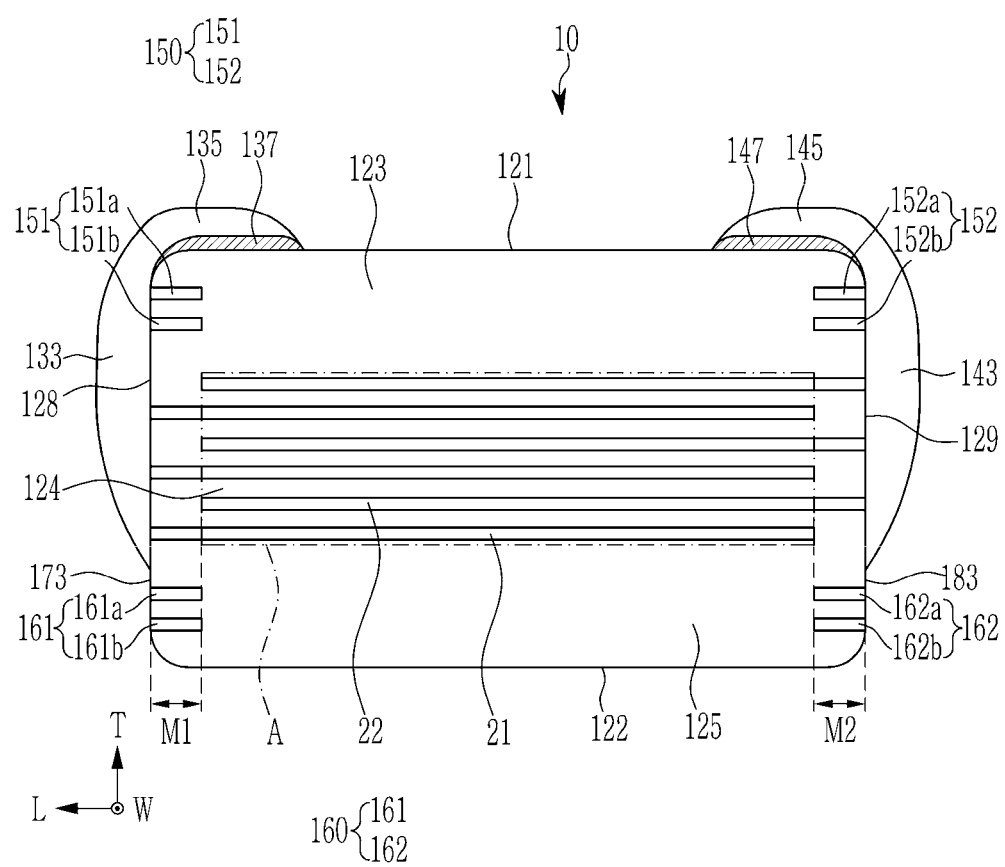
FIG. 2 is a cross-sectional view taken along line II-II' in FIG. 1.
Figure 3A:
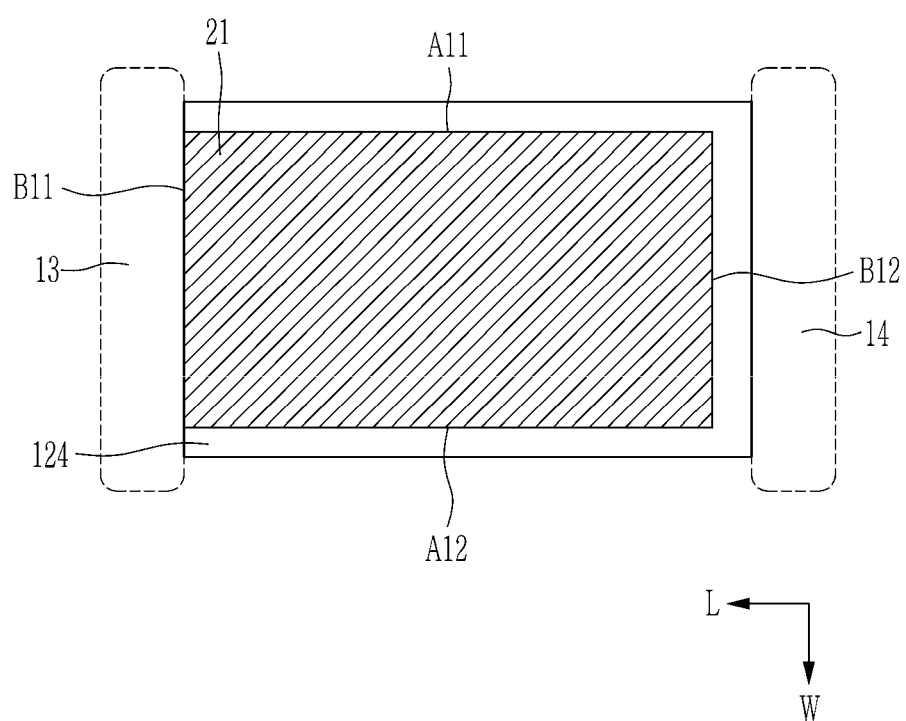
FIG. 3A is a top plan view schematically illustrating a first internal electrode of the multilayer ceramic capacitor in FIG. 1.
Figure 3B:
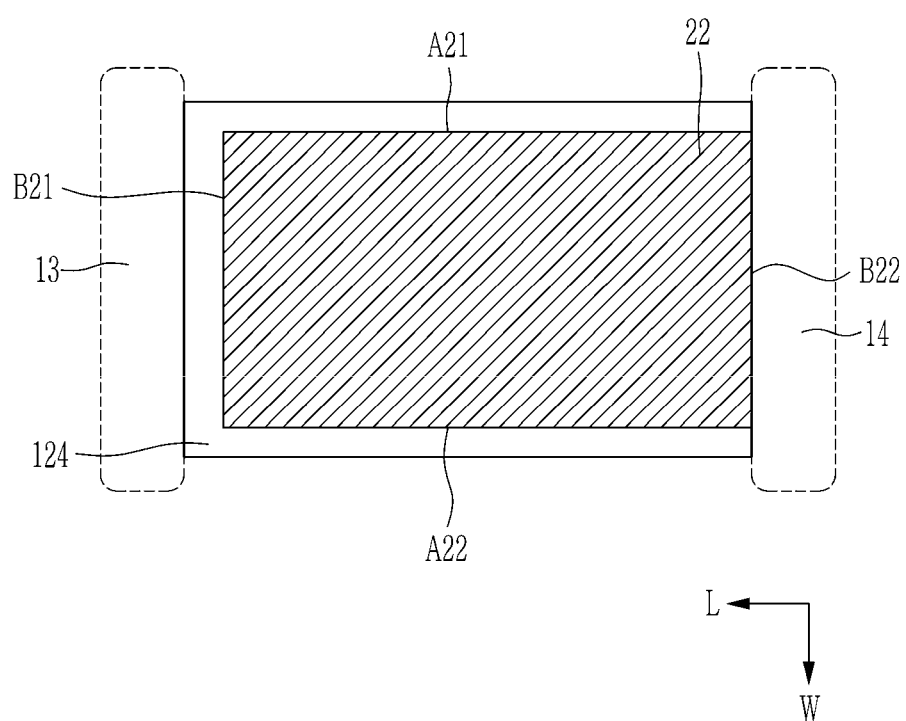
FIG. 3B is a top plan view schematically illustrating a second internal electrode of the multilayer ceramic capacitor in FIG. 1.

FIG. 1 is a perspective view schematically illustrating a multilayer ceramic capacitor according to the embodiment, FIG. 2 is a cross-sectional view taken along line II-II' in FIG. 1, FIG. 3A is a top plan view schematically illustrating a first internal electrode of the multilayer ceramic capacitor in FIG. 1, and FIG. 3B is a top plan view schematically illustrating a second internal electrode of the multilayer ceramic capacitor in FIG. 1.

With reference to FIGS. 1, 2, 3A, and 3B, a multilayer ceramic capacitor 10 according to the present embodiment includes a ceramic main body 12, first and second external electrodes 13 and 14, a plurality of first and second internal electrodes 21 and 22, a first dummy electrode pattern 150, and a second dummy electrode pattern 160.

First, directions are defined in order to clearly explain the present embodiment. An L-axis, a W-axis, and a T-axis illustrated in the drawings respectively indicate axes related to a length direction, a width direction, and a thickness direction of the multilayer ceramic capacitor 10.

The thickness direction (T-axis direction) may be a direction perpendicular to wide surfaces (main surfaces) of constituent elements having sheet shapes. For example, the thickness direction (T-axis direction) may be used as the same concept as a direction in which a dielectric layer is stacked.

The length direction (L-axis direction) may be a direction parallel to the wide surfaces (main surfaces) of the constituent elements having sheet shapes, i.e., a direction intersecting (or orthogonal to) the thickness direction (T-axis direction). For example, the length direction (L-axis direction) may be a direction in which the first external electrode 13 and the second external electrode 14 face each other.

The width direction (W-axis direction) may be a direction parallel to the wide surfaces (main surfaces) of the constituent elements having sheet shapes, i.e., a direction simultaneously intersecting (or orthogonal to) the thickness direction (T-axis direction) and the length direction (L-axis direction).

The ceramic main body 12 may be formed by stacking a plurality of dielectric layers 124 in the thickness direction (T-axis direction) and then sintering the plurality of dielectric layers 124. Here, the plurality of dielectric layers 124 of the ceramic main body 12, which is disposed adjacent to each other, may be integrated with an indistinct boundary therebetween. The ceramic main body 12 may have an approximately hexahedral shape having a preset length, width, and thickness along directions with the thickness being smaller than the width. However, the present disclosure is not limited thereto.

In the present embodiment, for convenience of description, surfaces of the ceramic main body 12, which face each other in the thickness direction (T-axis direction) in which the dielectric layers 124 are stacked, are respectively defined as an upper surface 121 and a lower surface 122. Surfaces of the ceramic main body 12, which connect the upper surface 121 and the lower surface 122 and face each other in the length direction (L-axis direction) of the ceramic main body 12, are respectively defined as first and second end surfaces 128 and 129. Surfaces of the ceramic main body 12, which face each other in the width direction (W-axis direction) perpendicularly intersecting the first and second end surfaces 128 and 129, are respectively defined as first and second lateral surfaces 126 and 127.

Therefore, a first direction, which is a direction in which the first end surface 128 and the second end surface 129 face each other, may be the length direction (L-axis direction), and second and third directions, which are perpendicular to the first direction and perpendicular to each other, may be respectively the thickness direction (T-axis direction) and the width direction (W-axis direction) or the width direction (W-axis direction) and the thickness direction (T-axis direction).

Based on an optical microscope or scanning electron microscope (SEM) image of a cross-section (taken in the length direction (L-axis direction) and the thickness direction (T-axis direction)) of a central portion of the ceramic main body 12 in the width direction (W-axis direction), a length of the ceramic main body 12 may mean a maximum value among lengths of a plurality of line segments that connects two outermost boundary lines, which are opposite to each other in the length direction (L-axis direction) of the ceramic main body 12 shown in the image of the cross-section, and is parallel to the length direction (L-axis direction). Meanwhile, the length of the ceramic main body 12 may mean a minimum value among the lengths of the plurality of line segments that connects the two outermost boundary lines, which are opposite to each other in the length direction (L-axis direction) of the ceramic main body 12 shown in the image of the cross-section, and is parallel to the length direction (L-axis direction). In the meantime, the length of the ceramic main body 12 may mean an arithmetic mean value of the lengths of at least two line segments among the plurality of line segments that connects the two outermost boundary lines, which are opposite to each other in the length direction (L-axis direction) of the ceramic main body 12 shown in the image of the cross-section, and is parallel to the length direction (L-axis direction).

Based on an optical microscope or scanning electron microscope (SEM) image of the cross-section (taken in the length direction (L-axis direction) and the thickness direction (T-axis direction)) of the central portion of the ceramic main body 12 in the width direction (W-axis direction), a thickness of the ceramic main body 12 may mean a maximum value among the lengths of the plurality of line segments that connects two outermost boundary lines, which are opposite to each other in the thickness direction (T-axis direction) of the ceramic main body 12 shown in the image of the cross-section, and is parallel to the thickness direction (T-axis direction). Meanwhile, the thickness of the ceramic main body 12 may mean a minimum value among the lengths of the plurality of line segments that connects the two outermost boundary lines, which are opposite to each other in the thickness direction (T-axis direction) of the ceramic main body 12 shown in the image of the cross-section, and is parallel to the thickness direction (T-axis direction). In the meantime, the thickness of the ceramic main body 12 may mean an arithmetic mean value of the lengths of at least two line segments among the plurality of line segments that connects the two outermost boundary lines, which are opposite to each other in the thickness direction (T-axis direction) of the ceramic main body 12 shown in the image of the cross-section, and is parallel to the thickness direction (T-axis direction).

Based on an optical microscope or scanning electron microscope (SEM) image of a cross-section (taken in the length direction (L-axis direction) and the width direction (W-axis direction)) of the central portion of the ceramic main body 12 in the thickness direction (T-axis direction), a width of the ceramic main body 12 may mean a maximum value among lengths of a plurality of line segments that connects two outermost boundary lines, which are opposite to each other in the width direction (W-axis direction) of the ceramic main body 12 shown in the image of the cross-section, and is parallel to the width direction (W-axis direction). Meanwhile, the width of the ceramic main body 12 may mean a minimum value among the lengths of the plurality of line segments that connects the two outermost boundary lines, which are opposite to each other in the width direction (W-axis direction) of the ceramic main body 12 shown in the image of the cross-section, and is parallel to the width direction (W-axis direction). In the meantime, the width of the ceramic main body 12 may mean an arithmetic mean value of the lengths of at least two line segments among the plurality of line segments that connects the two outermost boundary lines, which are opposite to each other in the width direction (W-axis direction) of the ceramic main body 12 shown in the image of the cross-section, and is parallel to the width direction (W-axis direction).

Meanwhile, the length, width, and thickness of the ceramic main body 12 may be measured in a micrometer measurement method. The micrometer measurement method may be performed by setting a zero point by using a micrometer with Gage R&R (repeatability and reproducibility), inserting the ceramic main body 12 according to the present embodiment between tips of the micrometer, and rotating a measurement lever of the micrometer. Meanwhile, at the time of measuring the length of the ceramic main body 12 by using the micrometer measurement method, the length of the ceramic main body 12 may mean a value measured once or an arithmetic mean of values measured multiple times. The same may also apply to the measurement of the width and thickness of the ceramic main body 12.

Meanwhile, a first cover layer 123 having a predetermined thickness may be provided on an upper portion of the internal electrode disposed at an uppermost side in the ceramic main body 12, and a second cover layer 125 may be provided on a lower portion of the internal electrode disposed at a lowermost side in the ceramic main body 12. The first cover layer 123 and the second cover layer 125 may have the same composition as the dielectric layer 124 and be formed by stacking one or more dielectric layers respectively on the upper portion of the internal electrode disposed at the uppermost side of the ceramic main body 12 and the lower portion of the internal electrode disposed at the lowermost side of the ceramic main body 12.

The first dummy electrode pattern 150 may be provided in the first cover layer 123, and the second dummy electrode pattern 160 may be provided in the second cover layer 125. The first dummy electrode pattern 150 and the second dummy electrode pattern 160 will be described below in more detail.

The dielectric layer 124 may include a ceramic material of high dielectric constant. For example, the dielectric layer 124 may include a $BaTiO_3$ (barium titanate)-based ceramic material. However, the present embodiment is not limited thereto. For example, the $BaTiO_3$-based ceramic materials may include $(Ba_{1-x}Ca_x) TiO_3$ (0<x<1), $Ba (Ti_{1-y}Ca_y) O_3$ (0<y<1), $(Ba_{1-x}Ca_x) (Ti_{1-y}Zr_y) O_3$ (0<x<1, 0<y<1), $Ba (Ti_{1-y}Zr_y) O_3$ (0<y<1), or the like in which calcium (Ca), zirconium (Zr), or the like are partially dissolved in $BaTiO_3$. However, the present embodiment is not limited thereto.

In addition, the dielectric layer 124 may further include one or more of a ceramic additive, an organic solvent, a plasticizer, a coupling agent, and a dispersant. For example, the ceramic additive may be a transition metal oxide or carbide, a rare-earth element, magnesium (Mg), aluminum (Al), or the like.

The first and second external electrodes 13 and 14 may be plated with conductive metal. The conductive metal may include nickel (Ni), copper (Cu), palladium (Pd), gold (Au), or an alloy thereof. However, the present embodiment is not limited thereto.

The first external electrode 13 is disposed on the first end surface 128 of the ceramic main body 12, and the second external electrode 14 is disposed on the second end surface 129 of the ceramic main body 12.

The first external electrode 13 includes a first junction portion 133 and a first band portion 135.

The first junction portion 133 is a portion electrically connected to an exposed end of the first internal electrode 21 while covering a part of the first end surface 128 of the ceramic main body 12. The exposed end of the first internal electrode 21 is plated with conductive metal, and the conductive metal is grown not only in the length direction (L-axis direction) but also in the thickness direction (T-axis direction) of the ceramic main body 12, thereby forming the first junction portion 133.

However, the conductive metal may be applied to cover only a portion of the second cover layer 125 of the side of the first end surface 128 without covering the entire first end surface 128 of the ceramic main body 12. If the conductive metal is applied to cover the entire first end surface 128, the first external electrode 13 may be grown to the lower surface 122 of the ceramic main body 12, and the multilayer ceramic capacitor 10 may be thickened to that extent, which makes it difficult to implement the thin multilayer ceramic capacitor.

The first band portion 135 may be a portion extending from the first junction portion 133 to partially cover the upper surface 121, the first lateral surface 126, and the second lateral surface 127 of the ceramic main body 12.

A first seed electrode layer 137 may be printed between the first band portion 135 and the upper surface 121 of the ceramic main body 12. Here, the first seed electrode layer 137 may be plated with conductive metal to form the first band portion 135.

The first seed electrode layer 137 may be formed by printing a paste containing a conductive metal (e.g., nickel (Ni)). Therefore, the first seed electrode layer 137 may be an area including sintering inhibitors in addition to the conductive metal. The first seed electrode layer 137 may be plated with conductive metal to define the first band portion 135. Unlike the first seed electrode layer 137, the first band portion 135 may be an area that rarely contain a component other than the conductive metal.

The first junction portion 133 may cover a part of the first end surface 128 of the ceramic main body 12. The first junction portion 133 may extend downward from an upper end of the first end surface 128 without extending to a lower end of the first end surface 128. That is, there may be a gap between a lower end of the first junction portion 133 and a lower end of the first end surface 128. Therefore, a part of a lower side of the first end surface 128 may be exposed by the first junction portion 133. The first end surface 128 may include a first exposed surface 173 that is not covered by the first junction portion 133.

The second external electrode 14 may include a second junction portion 143 and a second band portion 145.

The second junction portion 143 may be a portion electrically connected to an exposed end of the second internal electrode 22 while covering a part of the second end surface 129 of the ceramic main body 12. The exposed end of the second internal electrode 22 may be plated with conductive metal, and the conductive metal is grown not only in the length direction (L-axis direction) but also in the thickness direction (T-axis direction) of the ceramic main body 12, thereby forming the second junction portion 143.

However, the conductive metal may be applied to cover only a portion of the second cover layer 125 side of the second end surface 129 without covering the entire second end surface 129 of the ceramic main body 12. If the conductive metal is applied to cover the entire second end surface 129, the second external electrode 14 may be grown to the lower surface 122 of the ceramic main body 12, and the multilayer ceramic capacitor 10 is thickened to that extent, which makes it difficult to implement the thin multilayer ceramic capacitor.

The second band portion 145 may be a portion extending from the second junction portion 143 to partially cover the upper surface 121, the first lateral surface 126, and the second lateral surface 127 of the ceramic main body 12.

A second seed electrode layer 147 may be printed between the second band portion 145 and the upper surface of the ceramic main body 12. Here, the second seed electrode layer 147 may be plated with conductive metal to form the second band portion 145.

The second seed electrode layer 147 may be formed by printing a paste containing a conductive metal (e.g., nickel (Ni)). Therefore, the second seed electrode layer 147 may be an area including sintering inhibitors in addition to the conductive metal. The second seed electrode layer 147 may be plated with conductive metal to define the second band portion 145. Unlike the second seed electrode layer 147, the second band portion 145 may be an area that rarely contain a component other than the conductive metal.

The second junction portion 143 may cover a part of the second end surface 129 of the ceramic main body 12. The second junction portion 143 may extend downward from an upper end of the second end surface 129 without extending to a lower end of the second end surface 129. That is, there may be a gap between a lower end of the second junction portion 143 and the lower end of the second end surface 129. Therefore, a part of a lower side of the second end surface 129 may be exposed by the second junction portion 143. The second end surface 129 may include a second exposed surface 183 that is not covered by the second junction portion 143.

The first and second exposed surfaces 173 and 183 may be portions of the second cover layer 125. That is, the first and second exposed surfaces 173 and 183 may be portions of two opposite end surfaces of the second cover layer 125 in the length direction (L-axis direction). The second dummy electrode pattern 160 may be provided in the second cover layer 125 which includes the first and second exposed surfaces 173 and 183. The second dummy electrode pattern 160 may adjoin the first and second exposed surfaces 173 and 183 or be extended to the first and second exposed surfaces 173 and 183. The first dummy electrode pattern 150 and the second dummy electrode pattern 160 will be described below in more detail.

The plurality of first and second internal electrodes 21 and 22 are alternately stacked with the dielectric layers 124 interposed therebetween. The first and second internal electrodes 21 and 22 may be formed and stacked on a ceramic sheet configured to constitute the dielectric layer 124, and then the first and second internal electrodes 21 and 22 may be provided in the ceramic main body 12 and alternately disposed in the thickness direction with the single dielectric layer 124 interposed therebetween by a sintering process. The first and second internal electrodes 21 and 22 are electrodes having different polarities. The first and second internal electrodes 21 and 22 may be disposed to be opposite to each other in a direction in which the dielectric layers 124 are stacked. The first and second internal electrodes 21 and 22 may be electrically insulated from each other by the dielectric layer 124 disposed between the first and second internal electrodes 21 and 22.

The first and second internal electrodes 21 and 22 are disposed in a staggered manner in the length direction with the dielectric layer 124 interposed therebetween. One end of the first internal electrode 21 is exposed through the first end surface 128, and one end of the second internal electrode 22 is exposed through the second end surface 129. The end of the first internal electrode 21, which is exposed through the first end surface 128 of the ceramic main body 12 as described above, may be disposed on the first end surface 128 and electrically connected to the first junction portion 133 of the first external electrode 13. The end of the second internal electrode 22, which is exposed through the second end surface 129 of the ceramic main body 12, may be disposed on the second end surface 129 and electrically connected to the second junction portion 143 of the second external electrode 14.

With reference to FIGS. 3A and 3B, the first internal electrode 21 has a rectangular shape having a pair of long sides A11 and A12 facing each other in the width direction (W-axis direction), and a pair of short sides B11 and B12 facing each other in the length direction (L-axis direction), and the second internal electrode 22 has a rectangular shape having a pair of long sides A21 and A22 facing each other in the width direction (W-axis direction), and a pair of short sides B21 and B22 facing each other in the length direction (L-axis direction). The short side B11 of the first internal electrode 21 contacts one edge of the dielectric layer 124 in the length direction (L-axis direction), and the short side B12 is spaced apart from the opposite edge of the dielectric layer 124 in the length direction (L-axis direction). The short side B21 of the second internal electrode 22 is spaced apart from one edge of the dielectric layer 124 in the length direction (L-axis direction), and the short side B22 contacts the opposite edge of the dielectric layer 124 in the length direction (L-axis direction). That is, the first internal electrode 21 and the second internal electrode 22 are disposed to partially overlap each other in the thickness direction (T-axis direction). The short side B11 of the first internal electrode 21 is connected to the first external electrode 13, and the short side B22 of the second internal electrode 22 is connected to the second external electrode 14. As described above, in the present embodiment, the first external electrode 13 and the second external electrode 14 are respectively disposed on two surfaces of the ceramic main body 12 that face each other in the length direction (L-axis direction).

In addition, the first and second internal electrodes 21 and 22 may each be include conductive metal and include nickel (Ni), a nickel (Ni) alloy, or the like, for example. However, the present embodiment is not limited thereto.

With the above-mentioned configuration, electric charges are accumulated between the first and second internal electrodes 21 and 22, which are opposite to each other, when a predetermined voltage is applied to the first and second external electrodes 13 and 14. Here, the capacitance of the multilayer ceramic capacitor 10 is proportional to an overlap area in which the first and second internal electrodes 21 and 22 overlap each other in the direction in which the dielectric layers 124 are stacked.

Figure 4A:
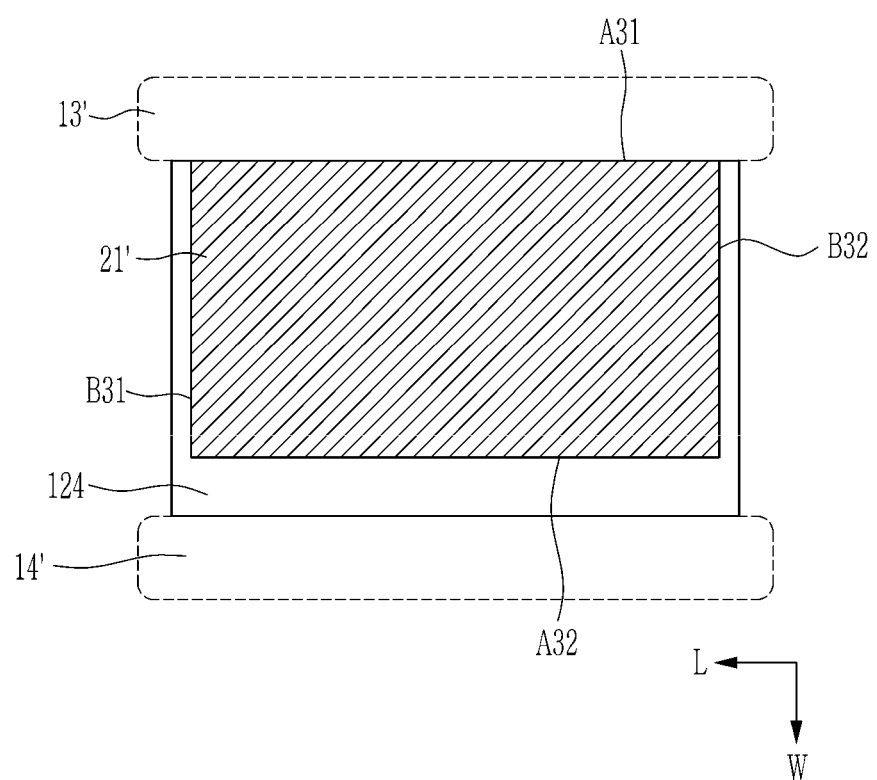
FIG. 4A is a top plan view schematically illustrating a first internal electrode of a multilayer ceramic capacitor according to another embodiment.
Figure 4B:
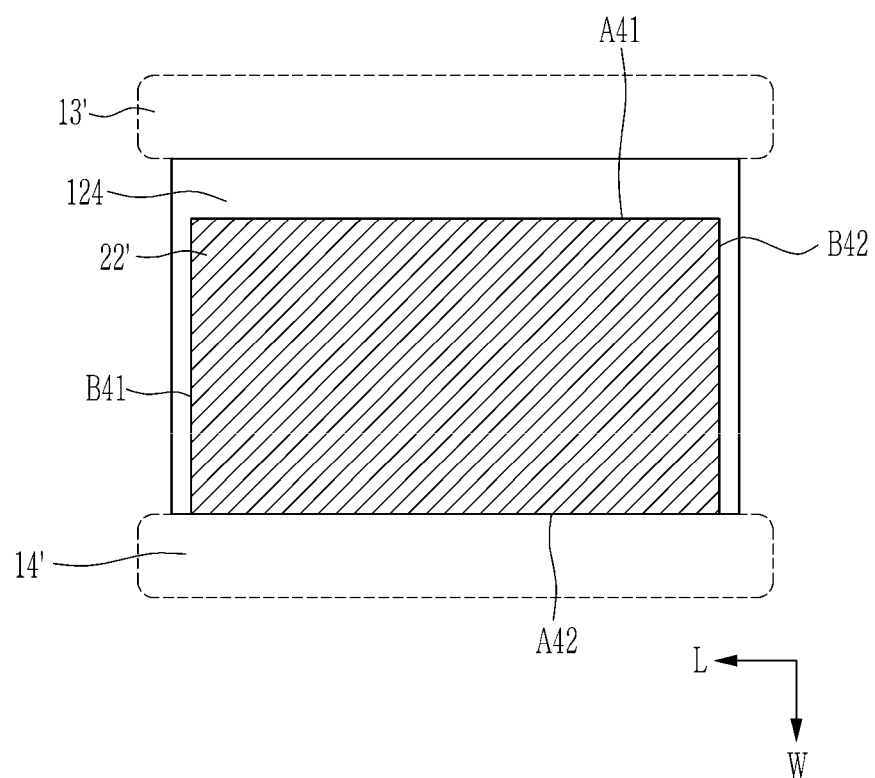
FIG. 4B is a top plan view schematically illustrating a second internal electrode of the multilayer ceramic capacitor according to another embodiment.

Meanwhile, in another embodiment, external electrodes may be respectively disposed on two surfaces of the ceramic main body that face each other in the width direction (W-axis direction). For example, with reference to FIGS. 4A and 4B, a first internal electrode 21' has a rectangular shape having a pair of long sides A31 and A32 facing each other in the width direction (W-axis direction), and a pair of short sides B31 and B32 facing each other in the length direction (L-axis direction), and a second internal electrode 22' has a rectangular shape having a pair of long sides A41 and A42 facing each other in the width direction (W-axis direction), and a pair of short sides B41 and B42 facing each other in the length direction (L-axis direction). The long side A31 of the first internal electrode 21' may contact one edge of the dielectric layer 124 in the width direction (W-axis direction), and the long side A32 may be spaced apart from the opposite edge of the dielectric layer 124 in the width direction (W-axis direction). The long side A41 of the second internal electrode 22' may be spaced apart from one edge of the dielectric layer 124 in the width direction (W-axis direction), and the long side A42 contacts the opposite edge of the dielectric layer 124 in the width direction (W-axis direction). That is, the first internal electrode 21 and the second internal electrode 22 are disposed to partially overlap each other in the thickness direction (T-axis direction). Here, the long side A31 of the first internal electrode 21' may be connected to a first external electrode 13', and the long side A42 of the second internal electrode 22' may be connected to a second external electrode 14'. That is, the first external electrode 13' and the second external electrode 14' are respectively disposed on two surfaces of the ceramic main body 12 that face each other in the width direction (W-axis direction).

Figure 5:
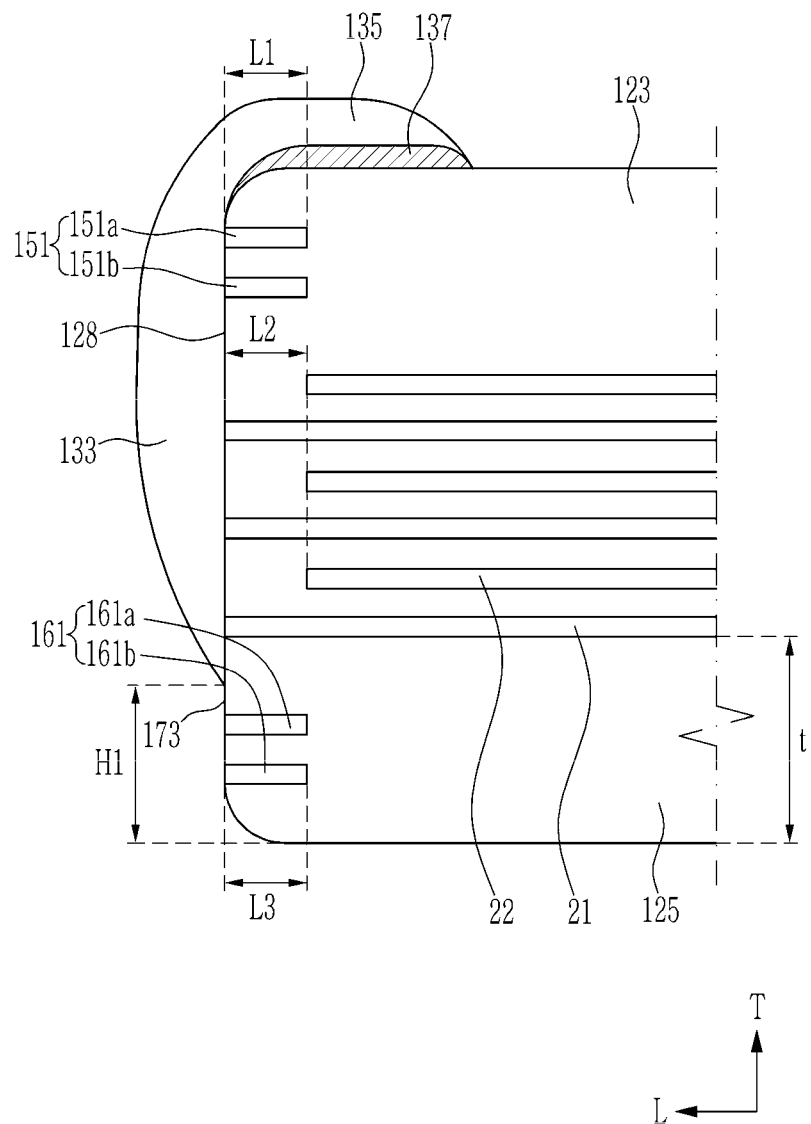
FIG. 5 is a partially enlarged view of FIG. 2.
Figure 6:
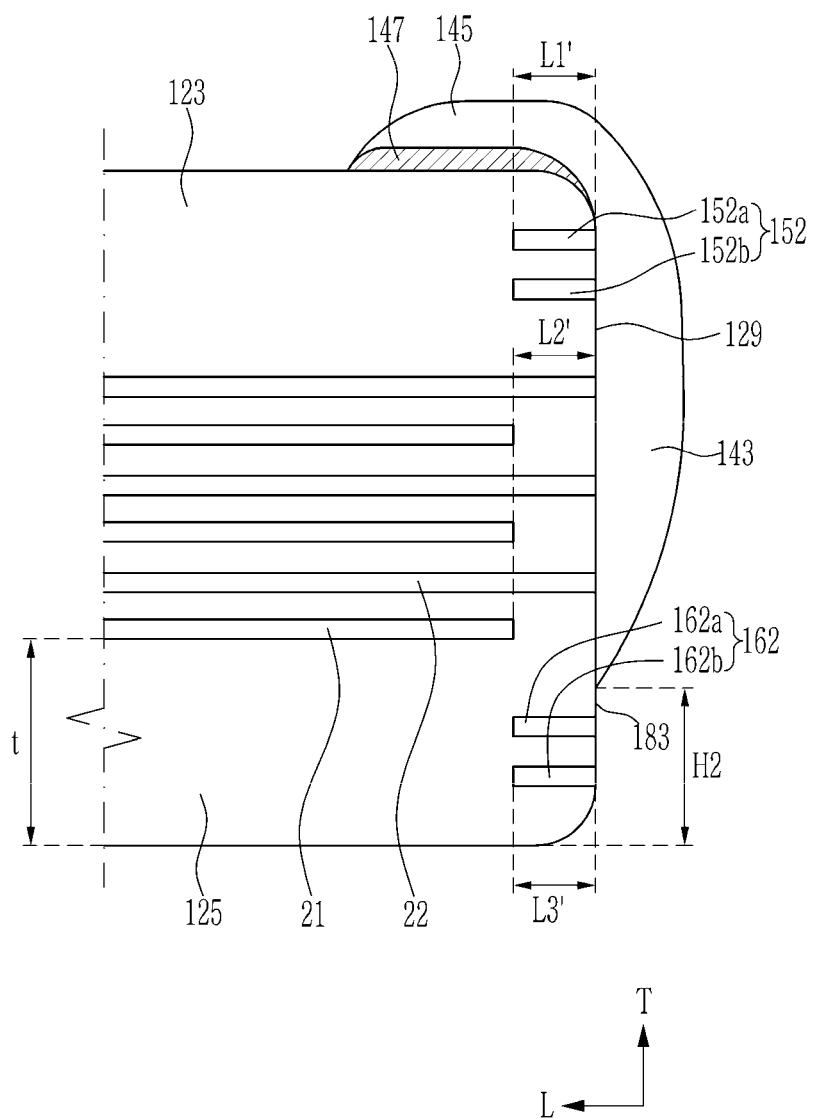
FIG. 6 is another partially enlarged view of FIG. 2.

Hereinafter, the present embodiment will be more specifically described with reference to FIGS. 1, 2, 5, and 6 together. FIG. 5 is a partially enlarged view of FIG. 2, and FIG. 6 is another partially enlarged view of FIG. 2.

The two opposite end surfaces of the first cover layer 123 in the length direction (L-axis direction) may be entirely covered by the first and second external electrodes 13 and 14, respectively. In contrast, the two opposite end surfaces of the second cover layer 125 in the length direction (L-axis direction) may be partially covered by the first and second external electrodes 13 and 14 and may have the exposed surfaces 173 and 183.

Unlike the second cover layer 125, the first cover layer 123 may not include an exposed surface. That is, the two opposite end surfaces of the first cover layer 123 in the length direction (L-axis direction) may be covered by the first and second external electrodes 13 and 14.

The second cover layer 125 may include the first exposed surface 173 and the second exposed surface 183. The first exposed surface 173 may be a portion of the first end surface 128 of the ceramic main body 12 that is not covered by the first external electrode 13. The second exposed surface 183 may be a portion of the second end surface 129 of the ceramic main body 12 that is not covered by the second external electrode 14. In other words, the first exposed surface 173 may be a part of the first end surface 128 and may be a surface exposed by the first external electrode 13. The second exposed surface 183 may be a part of the second end surface 129 and may be a surface exposed by the second external electrode 14.

A height H1 of the first exposed surface 173 and a height H2 of the second exposed surface 183 may each be smaller than a thickness t of the second cover layer 125.

For example, the height H1 of the first exposed surface 173, the height H2 of the second exposed surface 183, and the thickness t of the second cover layer 125 are measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The height H1 of the first exposed surface 173 may be a shortest distance between the lower end of the first junction portion 133 and a straight line parallel to the length direction (L-axis direction) and passing through an outermost point of the lower surface 122 in the thickness direction (T-axis direction) of the ceramic main body 12 shown in the above-mentioned cross-sectional image. The height H2 of the second exposed surface 183 may mean a shortest distance between the lower end of the second junction portion 143 and a straight line parallel to the length direction (L-axis direction) and passing through an outermost point of the lower surface 122 in the thickness direction (T-axis direction) of the ceramic main body 12 shown in the above-mentioned cross-sectional image. The thickness t of the second cover layer 125 may mean a minimum value of a thickness of the second cover layer 125 shown in the above-mentioned cross-sectional image.

As another example, the height H1 of the first exposed surface 173 may be a distance between an outer peripheral surface of the second cover layer 125 or an imaginary extension surface thereof and an edge adjacent to the second cover layer 125 among the edges of the first junction portion 133. The height H2 of the second exposed surface 183 may be a distance between an outer peripheral surface of the second cover layer 125 or an imaginary extension surface thereof and an edge adjacent to the second cover layer 125 among the edges of the second junction portion 143. The thickness t of the second cover layer 125 may be a distance between the internal electrode closest to an outer peripheral surface of the second cover layer 125 in the thickness direction of the ceramic main body 12, among the plurality of first and second internal electrodes 21 and 22, and an outer peripheral surface of the second cover layer 125 in the thickness direction of the ceramic main body 12.

The first external electrode 13 is plated and grown with the first internal electrode 21 as a seed, which is drawn out to the first end surface 128 of the ceramic main body 12. The first external electrode 13, which is plated with the lowermost internal electrode 22 in the thickness direction (T-axis direction) as a seed, grows not only in the length direction (L-axis direction) but also in the thickness direction (T-axis direction) of the ceramic main body 12, so that the lower end of the first external electrode 13 may be formed to be longer downwardly than the lowermost internal electrode 22 in the thickness direction (T-axis direction). In other words, the height H1 of the first exposed surface 173 may be smaller than the thickness t of the second cover layer 125.

If the height H1 of the first exposed surface 173 may be larger than the thickness t of the second cover layer 125, the lowermost internal electrode in the thickness direction (T-axis direction) extends to the first exposed surface 173 but may not be connected to the first junction portion 133 of the first external electrode 13.

The second external electrode 14 is plated and grown with the second internal electrode as a seed, which is drawn out to the second end surface 129 of the ceramic main body 12. The second external electrode 14, which is plated with the lowermost internal electrode 22 in the thickness direction (T-axis direction) as a seed, grows not only in the length direction (L-axis direction) but also in the thickness direction (T-axis direction) of the ceramic main body 12, so that the lower end of the second external electrode 14 may be formed to be longer downwardly than the lowermost internal electrode 22 in the thickness direction (T-axis direction). In other words, the height H2 of the second exposed surface 183 may be smaller than the thickness t of the second cover layer 125.

If the height H2 of the second exposed surface 183 may be larger than the thickness t of the second cover layer 125, the lowermost internal electrode in the thickness direction (T-axis direction) extends to the second exposed surface 183 but may not be connected to the second junction portion 143 of the second external electrode 14.

With reference to FIG. 2, the multilayer ceramic capacitor 10 according to the present embodiment includes an active area A, a first margin area M1, and a second margin area M2.

The active area A is an area in which the plurality of first and second internal electrodes 21 and 22 overlaps one another in the thickness direction (T-axis direction) of the ceramic main body 12. The first margin area M1 is an area between the active area A and the first end surface 128 of the ceramic main body 12. The second margin area M2 is an area between the active area A and the second end surface 129 of the ceramic main body 12.

The plurality of first and second internal electrodes 21 and 22 overlaps one another in the active area A, the plurality of first internal electrodes 21 is present in the first margin area M1, and the plurality of second internal electrodes 22 is present in the second margin area M2, such that the active area A and the margin areas M1 and M2 may be different in thickness. In other words, a level difference may be present between the margin areas M1 and M2. In case that the level difference is present, the multilayer ceramic capacitor cannot have an approximately rectangular parallelepiped shape, which can lead to mountability and reliability issues.

Meanwhile, because the ceramic main body 12 is made of a ceramic material and the external electrodes 13 and 14 are made of metal (e.g., nickel (Ni)), the difference in the shrinkage rate of the ceramic and the metal during sintering may cause a stress-concentrating zone in the ceramic main body 12, resulting in bending. When the bending occurs, a crack may be formed when the multilayer ceramic capacitor is mounted on the circuit board.

The ceramic main body 12 according to the present embodiment may have a structure having a thickness smaller than a width. For example, the thickness of the ceramic main body 12 may be larger than 0 and equal to or less than 80% of the width. Because the ceramic main body with this structure is relatively thin, there may be a high risk of physical damage such as cracks caused by external impact when the multilayer ceramic capacitor is mounted on the board. Further, if flatness of the ceramic main body is not high, stresses can concentrate on specific locations when the multilayer ceramic capacitor is mounted on the board, which increases a likelihood of fracture. For this reason, electrical characteristics may degrade, and moisture may be highly likely to penetrate through the fractured site.

Therefore, in the present embodiment, the dummy electrode patterns are formed in the margin areas M1 and M2 of the ceramic main body 12, which may improve the flatness by suppressing the occurrence of the level difference, control a difference in shrinkage rate caused during a sintering process, and suppress the occurrence of bending.

The first dummy electrode pattern 150 is provided in the first cover layer 123. Like the first and second internal electrodes 21 and 22, the first dummy electrode 150 may be formed by printing a conductive paste containing a conductive metal on the dielectric layer 124.

The first dummy electrode pattern 150 may include at least one first dummy electrode 151 (151*a* or 151*b*) and at least one second dummy electrode 152 (152*a* or 152*b*). The first dummy electrode 151 may adjoin the first end surface 128 or be drawn out to the first end surface 128. The second dummy electrode 152 may adjoin the second end surface 129 or be drawn out to the second end surface 129. In other words, the first dummy electrode 151 may be disposed to extend inward from the first end surface 128 in the length direction of the ceramic main body 12, and the second dummy electrode 152 may be disposed to extend inward from the second end surface 129 in the length direction of the ceramic main body 12.

A length L1 of the first dummy electrode 151 may be equal to or larger than a width L2 of the first margin area M1. Here, L1 means a distance between two opposite ends of the first dummy electrode 151 in the length direction of the ceramic main body 12. L2 means a distance between two opposite ends of the first margin area M1 in the length direction of the ceramic main body 12.

For example, the length L1 of the first dummy electrode 151 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L1 of the first dummy electrode 151 may mean a maximum or minimum value among lengths of a plurality of line segments that connects the two outermost boundary lines, which are opposite to each other in the length direction (L-axis direction) of the first dummy electrode 151 shown in the above-mentioned cross-sectional image, and is parallel to the length direction (L-axis direction). Alternatively, the length L1 of the first dummy electrode 151 may mean an arithmetic mean value of the lengths of the above-mentioned plurality of line segments. The width L2 of the first margin area M1 may mean an arithmetic mean value of values respectively measured at three points with equivalent intervals on the uppermost portion, three points with equivalent intervals on the intermediate portion, and three points with equivalent intervals on the lowermost portion in the first margin area M1 shown in the above-mentioned cross-sectional image.

If the length L1 of the first dummy electrode 151 is smaller than the width L2 of the first margin area M1, a level difference occurs between the first margin area M1 and the active area A, which may degrade the flatness.

A length L1' of the second dummy electrode 152 may be equal to or larger than a width L2' of the second margin area M2. Here, L1' means a distance between two opposite ends of the second dummy electrode 152 in the length direction of the ceramic main body 12. L2' means a distance between two opposite ends of the second margin area M2 in the length direction of the ceramic main body 12.

For example, the length L1' of the second dummy electrode 152 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L1' of the second dummy electrode 152 may mean a maximum or minimum value among lengths of a plurality of line segments that connects the two outermost boundary lines, which are opposite to each other in the length direction (L-axis direction) of the second dummy electrode 152 shown in the above-mentioned cross-sectional image, and is parallel to the length direction (L-axis direction). Alternatively, the length L1' of the second dummy electrode 152 may mean an arithmetic mean value of the lengths of the above-mentioned plurality of line segments. In addition, the width L2' of the second margin area M2 may mean an arithmetic mean value of values respectively measured at three points with equivalent intervals on the uppermost portion, three points with equivalent intervals on the intermediate portion, and three points with equivalent intervals on the lowermost portion in the second margin area M2 shown in the above-mentioned cross-sectional image.

If the length L1' of the second dummy electrode 152 is smaller than the width L2' of the second margin area M2, a level difference occurs between the second margin area M2 and the active area A, which may degrade the flatness.

The second dummy electrode pattern 160 is provided in the second cover layer 125. Like the first and second internal electrodes 21 and 22, the second dummy electrode 160 may be formed by printing a conductive paste containing a conductive metal on the dielectric layer 124.

The second dummy electrode pattern 160 may include at least one third dummy electrode 161 (161*a* or 161*b*) and at least one fourth dummy electrode 162 (162*a* or 162*b*). The third dummy electrode 161 may adjoin the first exposed surface 173 or be drawn out to the first exposed surface 173. The fourth dummy electrode 162 may adjoin the second exposed surface 183 or be drawn out to the second exposed surface 183. In other words, the third dummy electrode 161 may be disposed to extend inward from the first exposed surface 173 in the length direction (L-axis direction) of the ceramic main body 12, and the fourth dummy electrode 162 may be disposed to extend inward from the second exposed surface 183 in the length direction (L-axis direction) of the ceramic main body 12.

A length L3 of the third dummy electrode 161 may be equal to or larger than the width L2 of the first margin area M1. Here, L3 means a distance between two opposite ends of the third dummy electrode 161 in the length direction of the ceramic main body 12. L2 means a distance between two opposite ends of the first margin area M1 in the length direction of the ceramic main body 12.

For example, the length L3 of the third dummy electrode 153 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L3 of the third dummy electrode 153 may mean a maximum or minimum value among lengths of a plurality of line segments that connects the two outermost boundary lines, which are opposite to each other in the length direction (L-axis direction) of the third dummy electrode 161 shown in the above-mentioned cross-sectional image, and is parallel to the length direction (L-axis direction). Alternatively, the length L3 of the third dummy electrode 153 may mean an arithmetic mean value of the lengths of the above-mentioned plurality of line segments. In addition, the width L2 of the first margin area M1 may mean an arithmetic mean value of values respectively measured at three points with equivalent intervals on the uppermost portion, three points with equivalent intervals on the intermediate portion, and three points with equivalent intervals on the lowermost portion in the first margin area M1 shown in the above-mentioned cross-sectional image.

If the length L3 of the third dummy electrode 161 is smaller than the width L2 of the first margin area M1, a level difference occurs between the first margin area M1 and the active area A, which may degrade the flatness.

A length L3' of the fourth dummy electrode 162 may be equal to or larger than a width L2' of the second margin area M2. Here, L3' means a distance between two opposite ends of the fourth dummy electrode 162 in the length direction of the ceramic main body 12. L2' means a distance between two opposite ends of the second margin area M2 in the length direction of the ceramic main body 12.

For example, the length L3' of the fourth dummy electrode 162 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L3' of the fourth dummy electrode 162 may mean a maximum or minimum value among lengths of a plurality of line segments that connects the two outermost boundary lines, which are opposite to each other in the length direction (L-axis direction) of the fourth dummy electrode 162 shown in the above-mentioned cross-sectional image, and is parallel to the length direction (L-axis direction). Alternatively, the length L3' of the fourth dummy electrode 162 may mean an arithmetic mean value of the lengths of the above-mentioned plurality of line segments. In addition, the width L2' of the second margin area M2 may mean an arithmetic mean value of values respectively measured at three points with equivalent intervals on the uppermost portion, three points with equivalent intervals on the intermediate portion, and three points with equivalent intervals on the lowermost portion in the second margin area M2 shown in the above-mentioned cross-sectional image.

If the length L3' of the fourth dummy electrode 162 is smaller than the width L2' of the second margin area M2, a level difference occurs between the second margin area M2 and the active area A, which may degrade the flatness.

In addition, a sum S1 of thicknesses of the plurality of first internal electrodes 21 and the plurality of second internal electrodes 22 in the active area A may be larger than 0 and equal to or smaller than twice a sum S2 of thicknesses of the first dummy electrode pattern 150 and the second dummy electrode pattern 160. That is, $0 < S1 \leq 2*S2$.

For example, in case that a total sum of the thicknesses of the internal electrodes in the active area A is twice a total sum of the thicknesses of the internal electrodes in the margin areas M1 and M2, the thickness of the dummy electrode pattern may be determined to compensate for the differences in thickness of the internal electrodes. In other words, in this case, a total sum of the thicknesses of the dummy electrode patterns may be equal to a total sum of the thicknesses of the internal electrodes in the margin areas M1 and M2.

When the thickness of the dummy electrode pattern and the thickness of the internal electrode satisfy the above-mentioned ranges as described above, the occurrence of the level difference caused by the difference in the distribution of the internal electrodes between the active area A and the margin areas M1 and M2 may be minimized or suppressed.

In contrast, if the sum S1 of the thicknesses of the plurality of first internal electrodes 21 and the plurality of second internal electrodes 22 in the active area A is larger than twice the sum S2 of the thicknesses of the first dummy electrode pattern 150 and the second dummy electrode pattern 160, an effect of improving flatness by disposing the dummy electrode patterns may be insufficient.

The first and second dummy electrode patterns 150 and 160 may include the plurality of dummy electrodes. That is, the first dummy electrode pattern 150 may include the plurality of first dummy electrodes 151a and 151b and the plurality of second dummy electrodes 152a and 152b. The plurality of first dummy electrodes 151a and 151b may be spaced apart from one another in the thickness direction (T-axis direction), and an interval therebetween may be uniform. The plurality of second dummy electrodes 152a and 152b may be spaced apart from one another in the thickness direction (T-axis direction), and an interval therebetween may be uniform. In addition, the second dummy electrode pattern 160 may include the plurality of third dummy electrodes 161a and 161b and the plurality of fourth dummy electrodes 162a and 162b. The plurality of third dummy electrodes 161a and 161b may be spaced apart from one another in the thickness direction (T-axis direction), and an interval therebetween may be uniform. The plurality of fourth dummy electrodes 162a and 162b may be spaced apart from one another in the thickness direction (T-axis direction), and an interval therebetween may be uniform.

The first dummy electrode pattern 150 and the second dummy electrode pattern 160 may each include nickel (Ni), copper (Cu), tin (Sn), palladium (Pd), gold (Au), or an alloy thereof. However, the present disclosure is not limited thereto.

Figure 7:
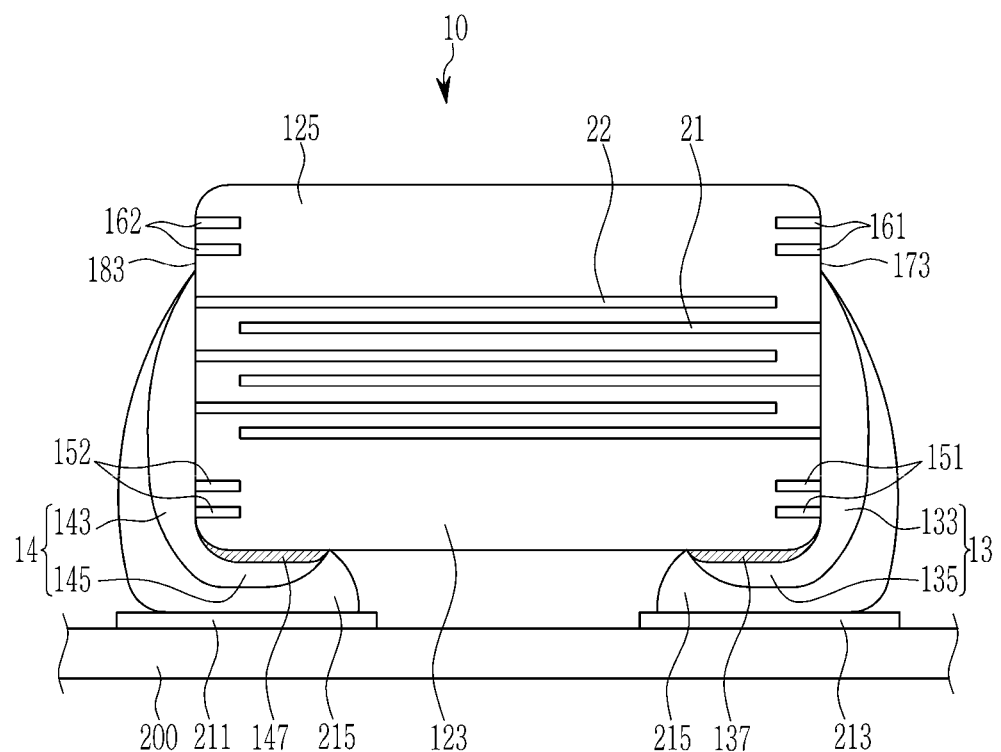
FIG. 7 is a schematic cross-sectional view illustrating a state in which the multilayer ceramic capacitor illustrated in FIG. 1 is mounted on a board.

FIG. 7 is a schematic cross-sectional view illustrating a state in which the multilayer ceramic capacitor illustrated in FIG. 1 is mounted on a board.

With reference to FIG. 7, the multilayer ceramic capacitor 10 is connected to first and second electrode pads 211 and 213 provided on an upper surface of a circuit board 200 by means of conductive joining members 215. That is, the multilayer ceramic capacitor 10 may be mounted on the circuit board 200 by means of the first and second electrode pads 211 and 213.

The first and second electrode pads 211 and 213 may be disposed on the upper surface of the circuit board 200 and spaced apart from each other. The first band portion 135 of the first external electrode 13 of the multilayer ceramic capacitor 10 may be fixed to the circuit board 200 by means of the conductive joining member 215 in a state in which the first band portion 135 is disposed to be in contact with the first electrode pad 211. The second band portion 145 of the second external electrode 14 may be fixed to the circuit board 200 by means of the conductive joining member 215 in a state in which the second band portion 145 is disposed to be in contact with the second electrode pad 213. Meanwhile, the first junction portion 133 of the first external electrode 13 may also be covered with the conductive joining member 215, and the second junction portion 143 of the second external electrode 14 may also be covered with the conductive joining member 215. Therefore, the multilayer ceramic capacitor 10 may be electrically connected to the first and second electrode pads 211 and 213 of the circuit board 200. For example, the conductive joining member 215 may include solder.

In the present embodiment, the first external electrode 13 of the multilayer ceramic capacitor 10 may be mounted on the circuit board 200 by being fixed to the first electrode pad 211 by the conductive junction member 215, and the second external electrode 14 is mounted on the circuit board 200 by being fixed to the second electrode pad 213 by the conductive junction member 215.

When a typical multilayer ceramic capacitor is mounted on the circuit board, if the board bends, stresses can be concentrated at the ends of the band portions of the external electrodes, causing flex cracks to propagate. In contrast, in the present embodiment, the first dummy electrode pattern 150 having the above-mentioned length is disposed on the portion where stresses are concentrated during mounting, which may suppress the occurrence of flex cracks.

That is, the multilayer ceramic capacitor 10 according to the present embodiment has the first dummy electrode pattern 150 and the second dummy electrode pattern 160 respectively provided on the first cover layer 123 and the second cover layer 125, the first dummy electrode 151 and the second dummy electrode 152 of the first dummy electrode pattern 150 and the third dummy electrode 161 and the fourth dummy electrode 162 of the second dummy electrode pattern 160 have the above-mentioned thicknesses and lengths. The length L1 of the first dummy electrode 151 may be equal to or larger than the width L2 of the first margin area M1, and the length L1' of the second dummy electrode 152 may be equal to or larger than the width L2' of the second margin area M2. In addition, the length L3 of the third dummy electrode 161 may be equal to or larger than the width L2 of the first margin area M1, and the length L3' of the fourth dummy electrode 162 is equal to or larger than the width L2' of the second margin area M2. In addition, the sum S1 of the thicknesses of the plurality of first internal electrodes 21 and the plurality of second internal electrodes 22 in the active area A may be larger than 0 and equal to or smaller than twice the sum S2 of the thicknesses of the first dummy electrode pattern 150 and the second dummy electrode pattern 160. That is, $0<S1\leq 2*S2$.

Because the multilayer ceramic capacitor 10 according to the present embodiment has the dummy electrode patterns as described above, resistance against stress is high, which makes it possible to prevent the occurrence of the flex cracks even if stress is concentrated on the ends of the band portions 135 and 145 at the time of mounting the multilayer ceramic capacitor 10 on the circuit board 200.

In contrast, unlike the multilayer ceramic capacitor according to the present embodiment, in case that no dummy electrodes are provided, stresses may be concentrated at the ends of the band portions 135 and 145 at the time of mounting the multilayer ceramic capacitor 10 on the circuit board 200, leading to fracture and consequent flex cracks.

Figure 8:
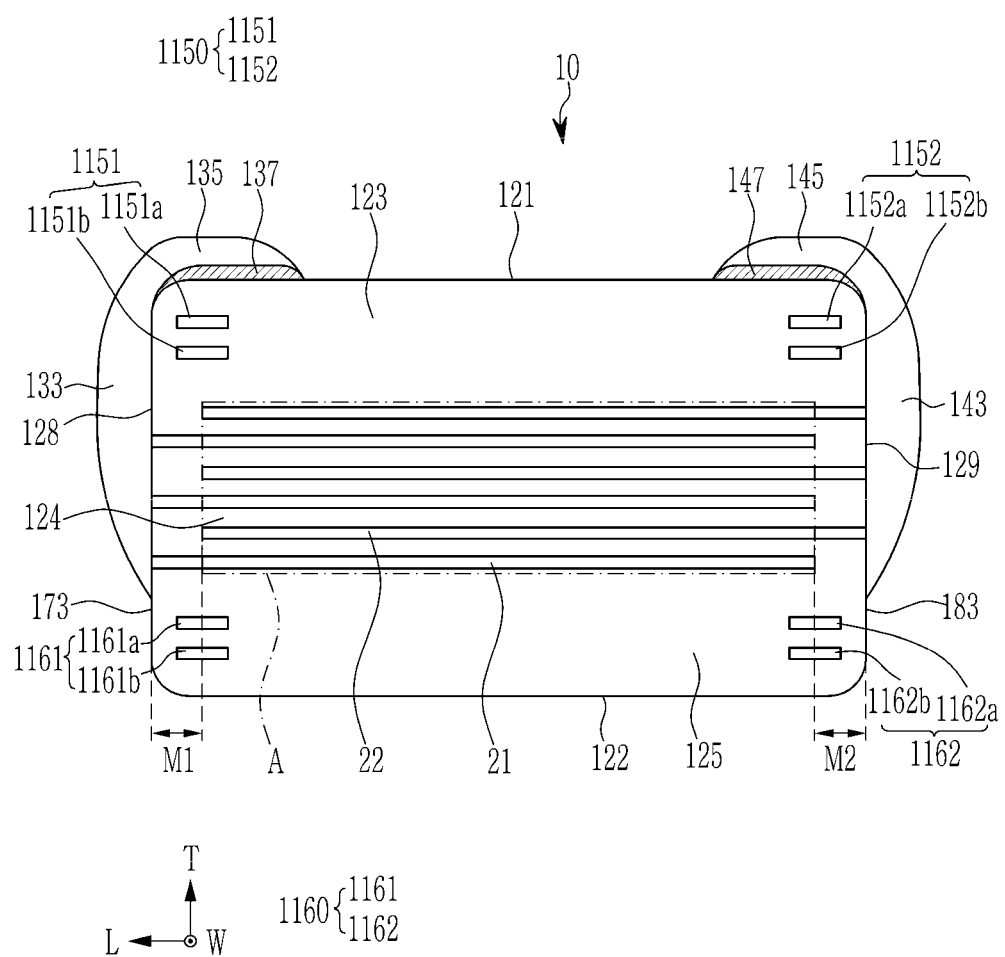
FIG. 8 is a schematic cross-sectional view illustrating a multilayer ceramic capacitor according to another embodiment.
Figure 9:
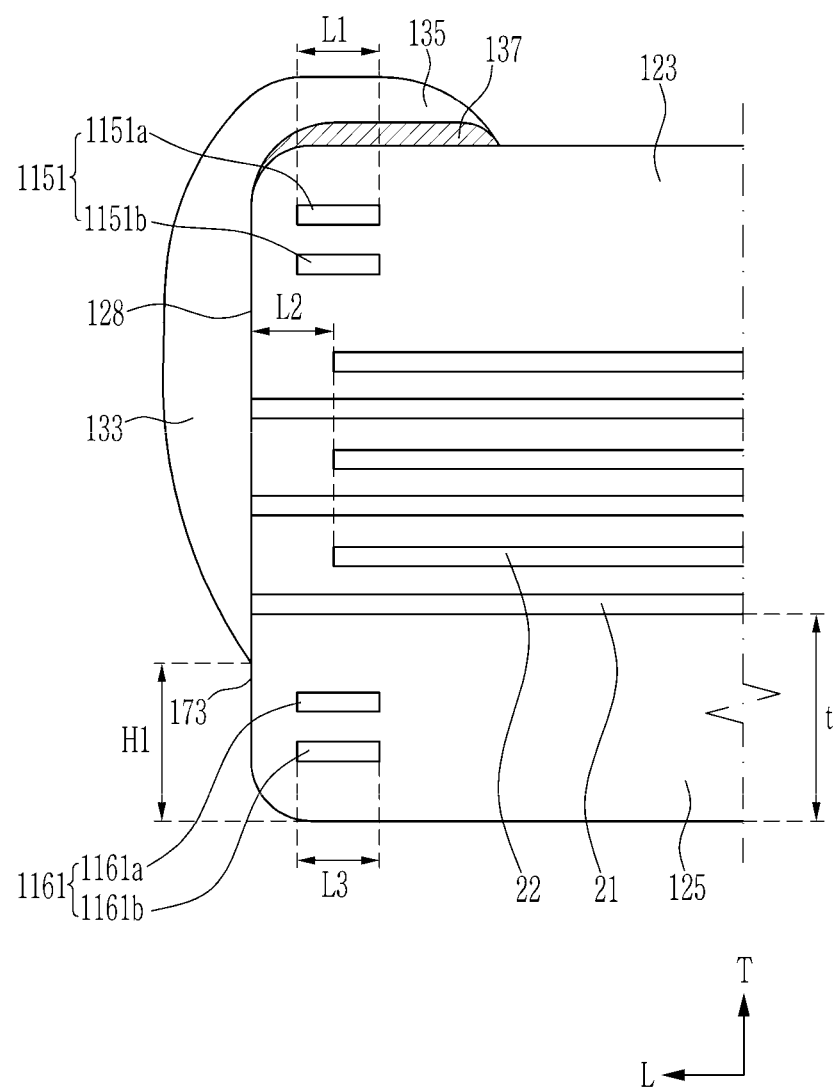
FIG. 9 is a partially enlarged view of FIG. 8.
Figure 10:
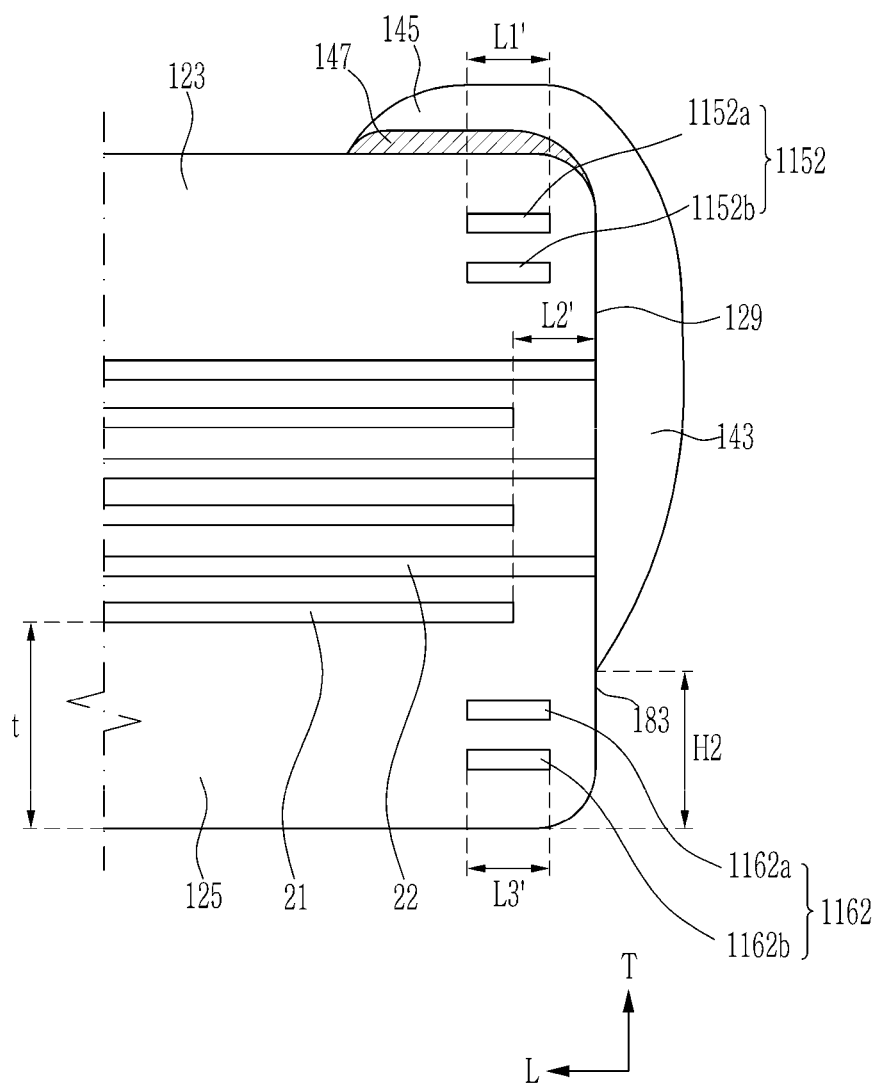
FIG. 10 is another partially enlarged view of FIG. 8.

FIG. 8 is a schematic cross-sectional view illustrating a multilayer ceramic capacitor according to another embodiment, FIG. 9 is a partially enlarged view of FIG. 8, and FIG. 10 is another partially enlarged view of FIG. 8.

With reference to FIGS. 8, 9, and 10, the first dummy electrode pattern 1150 may include at least one first dummy electrode 1151 (1151a or 1151b) and at least one second dummy electrode 1152 (1152a or 1152b). The first dummy electrode 1151 extends outward from the inside in the length direction of the ceramic main body 12 without reaching the first end surface 128 of the ceramic main body 12, and the second dummy electrode 1152 extends outward from the inside in the length direction of the ceramic main body 12 without reaching the second end surface 129 of the ceramic main body 12. That is, an interval is present between the first dummy electrode 1151 and the first end surface 128 of the ceramic main body 12, and an interval is present between the second dummy electrode 1152 and the second end surface 129 of the ceramic main body 12.

A length L1 of the first dummy electrode 1151 may be equal to or larger than a width L2 of the first margin area M1. Here, L1 means a distance between two opposite ends of the first dummy electrode 1151 in the length direction of the ceramic main body 12. L2 means a distance between two opposite ends of the first margin area M1 in the length direction of the ceramic main body 12.

For example, the length L1 of the first dummy electrode 1151 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L1 of the first dummy electrode 1151 may mean a maximum or minimum value among lengths of a plurality of line segments that connects the two outermost boundary lines, which are opposite to each other in the length direction (L-axis direction) of the first dummy electrode 1151 shown in the above-mentioned cross-sectional image, and is parallel to the length direction (L-axis direction). Alternatively, the length L1 of the first dummy electrode 1151 may mean an arithmetic mean value of the lengths of the above-mentioned plurality of line segments. In addition, the width L2 of the first margin area M1 may mean an arithmetic mean value of values respectively measured at three points with equivalent intervals on the uppermost portion, three points with equivalent intervals on the intermediate portion, and three points with equivalent intervals on the lowermost portion in the first margin area M1 shown in the above-mentioned cross-sectional image.

A length L1' of the second dummy electrode 1152 may be equal to or larger than a width L2' of the second margin area M2. Here, L1' means a distance between two opposite ends of the second dummy electrode 1152 in the length direction of the ceramic main body 12. L2' means a distance between two opposite ends of the second margin area M2 in the length direction of the ceramic main body 12.

For example, the length L1' of the second dummy electrode 1152 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L1' of the second dummy electrode 1152 may mean a maximum or minimum value among lengths of a plurality of line segments that connects the two outermost boundary lines, which are opposite to each other in the length direction (L-axis direction) of the second dummy electrode 1152 shown in the above-mentioned cross-sectional image, and is parallel to the length direction (L-axis direction). Alternatively, the length L1' of the second dummy electrode 1152 may mean an arithmetic mean value of the lengths of the above-mentioned plurality of line segments. In addition, the width L2' of the second margin area M2 may mean an arithmetic mean value of values respectively measured at three points with equivalent intervals on the uppermost portion, three points with equivalent intervals on the intermediate portion, and three points with equivalent intervals on the lowermost portion in the second margin area M2 shown in the above-mentioned cross-sectional image.

The second dummy electrode pattern 1160 may include at least one third dummy electrode 1161 (1161a or 1161b) and at least one fourth dummy electrode 1162 (1162a or 1162b). The third dummy electrode 1161 extends outward from the inside in the length direction of the ceramic main body 12 without reaching the first exposed surface 173 of the ceramic main body 12, and the fourth dummy electrode 1162 extends outward from the inside in the length direction of the ceramic main body 12 without reaching the second exposed surface 183 of the ceramic main body 12. That is, an interval is present between the third dummy electrode 1161 and the first exposed surface 173 of the ceramic main body 12, and an interval is present between the fourth dummy electrode 1162 and the second exposed surface 183 of the ceramic main body 12.

A length L3 of the third dummy electrode 1161 may be equal to or larger than the width L2 of the first margin area M1. Here, L3 means a distance between two opposite ends of the third dummy electrode 1161 in the length direction of the ceramic main body 12. L2 means a distance between two opposite ends of the first margin area M1 in the length direction of the ceramic main body 12.

A length L3' of the fourth dummy electrode 1162 may be equal to or larger than a width L2' of the second margin area M2. Here, L3' means a distance between two opposite ends of the fourth dummy electrode 1162 in the length direction of the ceramic main body 12. L2' means a distance between two opposite ends of the second margin area M2 in the length direction of the ceramic main body 12.

Because the length L3 of the third dummy electrode 1161 and the length L3' of the fourth dummy electrode 1162 may be measured in the same way as the length of the first dummy electrode 1151 and the length of the second dummy electrode 1152, a redundant description thereof will be omitted.

Except for the above, the multilayer ceramic capacitor according to the embodiment illustrated in FIGS. 8 to 10 is identical to the multilayer ceramic capacitor according to the embodiment illustrated in FIGS. 1 to 7, and a description of the overlapping or identical components will be omitted.

Figure 11:
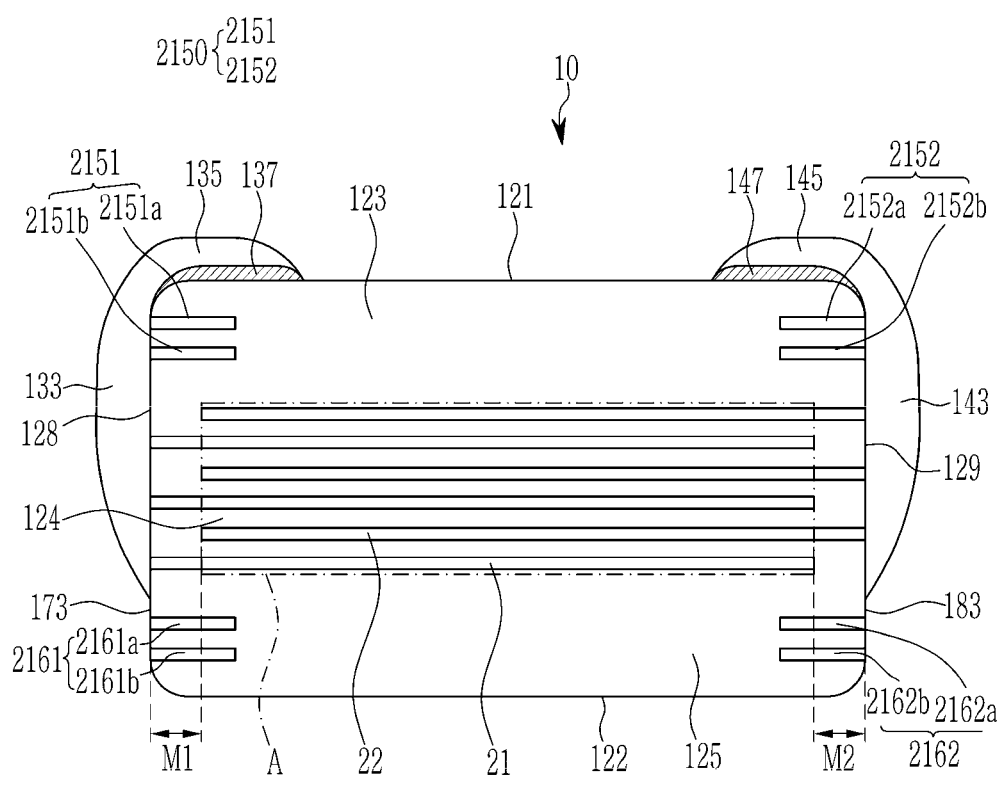
FIG. 11 is a schematic cross-sectional view illustrating a multilayer ceramic capacitor according to still another embodiment.
Figure 12:
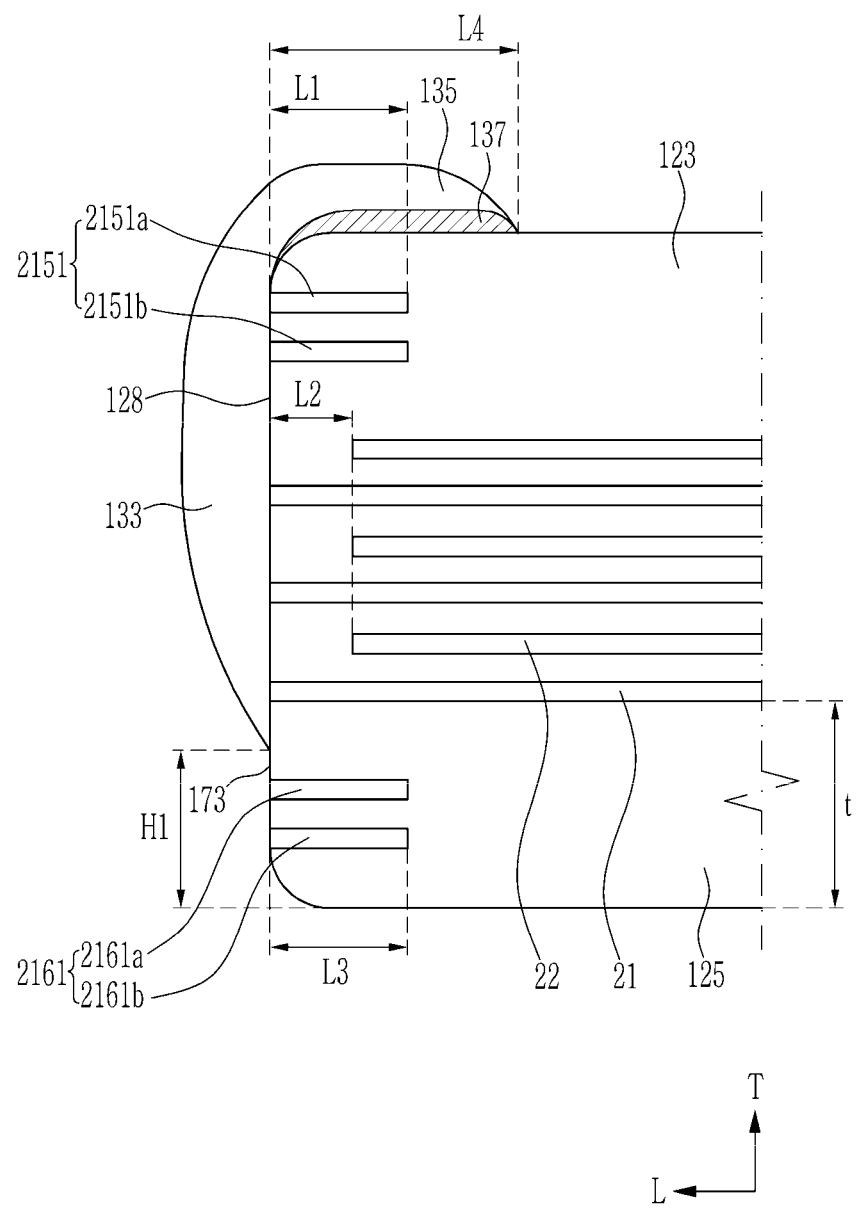
FIG. 12 is a partially enlarged view of FIG. 11.
Figure 13:
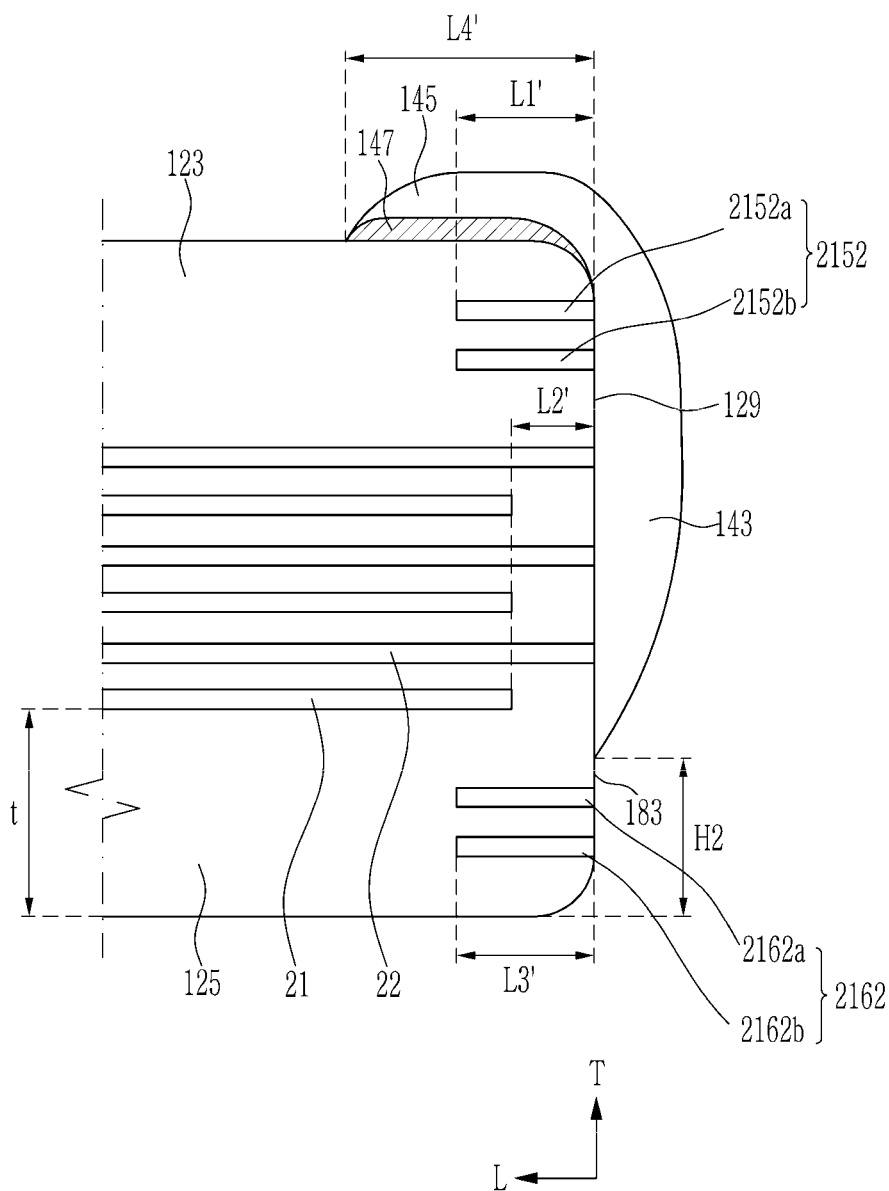
FIG. 13 is another partially enlarged view of FIG. 11.

FIG. 11 is a schematic cross-sectional view illustrating a multilayer ceramic capacitor according to still another embodiment, FIG. 12 is a partially enlarged view of FIG. 11, and FIG. 13 is another partially enlarged view of FIG. 11.

With reference to FIGS. 11, 12, and 13, the first dummy electrode pattern 2150 may include at least one first dummy electrode 2151 (2151a or 2151b) and at least one second dummy electrode 2152 (2152a or 2152b). The first dummy electrode 2151 extends outward from the inside in the length direction of the ceramic main body 12 and reaches the first end surface 128 of the ceramic main body 12, and the second dummy electrode 2152 extends outward from the inside in the length direction of the ceramic main body 12 and reaches the second end surface 129 of the ceramic main body 12. That is, the first dummy electrode 2151 may adjoin the first end surface 128 of the ceramic main body 12 or be drawn out to the first end surface 128, and the second dummy electrode 2152 may adjoin the second end surface 129 of the ceramic main body 12 or be drawn out to the second end surface 129. In other words, the first dummy electrode 2151 is disposed to extend inward from the first end surface 128 in the length direction of the ceramic main body 12, and the second dummy electrode 2152 is disposed to extend inward from the second end surface 129 in length direction of the ceramic main body 12.

A length L1 of the first dummy electrode 2151 may be smaller than a length L4 of the first band portion 135. Here, L1 means a distance between two opposite ends of the first dummy electrode 2151 in the length direction of the ceramic main body 12, and L4 means a distance between the first end surface 128 of the ceramic main body 12 or an imaginary extension surface thereof and an edge opposite to the first end surface 128 of the ceramic main body 12 among the edges of the first band portion 135.

The length L1 of the first dummy electrode 2151 may be larger than the width L2 of the first margin area M1. Here, L1 means a distance between two opposite ends of the first dummy electrode 2151 in the length direction of the ceramic main body 12. L2 means a distance between two opposite ends of the first margin area M1 in the length direction of the ceramic main body 12.

For example, the length L1 of the first dummy electrode 2151 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L1 of the first dummy electrode 2151 may mean a maximum or minimum value among lengths of a plurality of line segments that connects the two outermost boundary lines, which are opposite to each other in the length direction (L-axis direction) of the first dummy electrode 2151 shown in the above-mentioned cross-sectional image, and is parallel to the length direction (L-axis direction). Alternatively, the length L1 of the first dummy electrode 2151 may mean an arithmetic mean value of the lengths of the above-mentioned plurality of line segments. In addition, the length L4 of the first band portion 135 may mean a shortest distance between a straight line passing through the outermost side point of the first end surface 128 in the length direction (L-axis direction) shown in the above-mentioned cross-section image and the edge opposite to the first end surface 128 of the first band portion 135. In addition, the width L2 of the first margin area M1 may mean an arithmetic mean value of values respectively measured at three points with equivalent intervals on the uppermost portion, three points with equivalent intervals on the intermediate portion, and three points with equivalent intervals on the lowermost portion in the first margin area M1 shown in the above-mentioned cross-sectional image.

The length L1' of the second dummy electrode 2152 may be smaller than a length L4' of the second band portion 145. Here, L1' means a distance between two opposite ends of the second dummy electrode 2152 in the length direction of the ceramic main body 12, and L4' means a distance between the second end surface 129 of the ceramic main body 12 or an imaginary extension surface thereof and an edge opposite to the second end surface 129 of the ceramic main body 12 among the edges of the second band portion 145.

The length L1' of the second dummy electrode 2152 may be larger than the width L2' of the second margin area M2. Here, L1' means a distance between two opposite ends of the second dummy electrode 2152 in the length direction of the ceramic main body 12. L2' means a distance between two opposite ends of the second margin area M2 in the length direction of the ceramic main body 12.

For example, the length L1' of the second dummy electrode 2152 is measured on the basis of an optical microscope or scanning electron microscope (SEM) image of the cross-section (taken in the length direction (L-axis direction) and the thickness direction (T-axis direction)) of the central portion of the multilayer ceramic capacitor 10 in the width direction (W-axis direction). The length L1' of the second dummy electrode 2152 may mean a maximum or minimum value among lengths of a plurality of line segments that connects the two outermost boundary lines, which are opposite to each other in the length direction (L-axis direction) of the second dummy electrode 2152 shown in the above-mentioned cross-section image, and is parallel to the length direction (L-axis direction). Alternatively, the length L1' of the second dummy electrode 1152 may mean an arithmetic mean value of the lengths of the above-mentioned plurality of line segments. In addition, the length L4' of the second band portion 145 may mean a shortest distance between a straight line passing through the outermost side point of the second end surface 129 in the length direction (L-axis direction) shown in the above-mentioned cross-sectional image and the edge opposite to the second end surface 129 of the second band portion 145. In addition, the width L2' of the second margin area M2 may mean an arithmetic mean value of values respectively measured at three points with equivalent intervals on the uppermost portion, three points with equivalent intervals on the intermediate portion, and three points with equivalent intervals on the lowermost portion in the second margin area M2 shown in the above-mentioned cross-sectional image.

The second dummy electrode pattern 2160 may include at least one third dummy electrode 2161 (2161*a* or 2161*b*) and at least one fourth dummy electrode 2162 (2162*a* or 2162*b*). The third dummy electrode 2161 extends outward from the inside in the length direction of the ceramic main body 12 and reaches the first exposed surface 173 of the ceramic main body 12. That is, the third dummy electrode 2161 may adjoin the first exposed surface 173 of the ceramic main body 12 or be drawn out to the first exposed surface 173. In other words, the third dummy electrode 2161 may be disposed to extend inward from the first exposed surface 173 in the length direction of the ceramic main body 12.

The length L3 of the third dummy electrode 2161 may be smaller than the length L4 of the first band portion 135. Here, L3 means a distance between two opposite ends of the third dummy electrode 2161 in the length direction of the ceramic main body 12, and L4 means a distance between the first end surface 128 of the ceramic main body 12 or an imaginary extension surface thereof and an edge opposite to the first end surface 128 of the ceramic main body 12 among the edges of the first band portion 135.

The length L3 of the third dummy electrode 2161 may be larger than the width L2 of the first margin area M1. Here, L3 means a distance between two opposite ends of the third dummy electrode 2161 in the length direction of the ceramic main body 12. L2 means a distance between two opposite ends of the first margin area M1 in the length direction of the ceramic main body 12.

The fourth dummy electrode 2162 extends outward from the inside in the length direction of the ceramic main body 12 and reaches the second exposed surface 183 of the ceramic main body 12. That is, the fourth dummy electrode 2162 may adjoin the second exposed surface 183 of the ceramic main body 12 or be drawn out to the second exposed surface 183. In other words, the fourth dummy electrode 2162 may be disposed to extend inward from the second exposed surface 183 in the length direction of the ceramic main body 12.

The length L3' of the fourth dummy electrode 2162 may be smaller than a length L4' of the second band portion 145. Here, L3' means a distance between two opposite ends of the fourth dummy electrode 2162 in the length direction of the ceramic main body 12, and L4' means a distance between the second end surface 129 of the ceramic main body 12 or an imaginary extension surface thereof and an edge opposite to the second end surface 129 of the ceramic main body 12 among the edges of the second band portion 145.

The length L3' of the fourth dummy electrode 2162 may be larger than the width L2' of the second margin area M2. Here, L3' means a distance between two opposite ends of the fourth dummy electrode 2162 in the length direction of the ceramic main body 12. L2' means a distance between two opposite ends of the second margin area M2 in the length direction of the ceramic main body 12.

Because the length L3 of the third dummy electrode 2161 and the length L3' of the fourth dummy electrode 2162 may be measured in the same way as the length of the first dummy electrode 2151 and the length of the second dummy electrode 2152, a redundant description thereof will be omitted.

Except for the above, the multilayer ceramic capacitor according to the embodiment illustrated in FIGS. 11 to 13 is identical to the multilayer ceramic capacitor according to the embodiment illustrated in FIGS. 1 to 7, and a description of the overlapping or identical components will be omitted.

Meanwhile, it is possible to provide a multilayer ceramic capacitor having a combination of some of the characteristics of the multilayer ceramic capacitor according to the embodiment illustrated in FIGS. 1 to 7 and some of the characteristics of the multilayer ceramic capacitor according to the embodiment illustrated in FIGS. 8 to 10.

The first and second dummy electrodes may have the structure illustrated in FIGS. 1 to 7, the third and fourth dummy electrodes may have the structure illustrated in FIGS. 8 to 10, and vice versa.

Further, the first and second dummy electrodes may have the structure illustrated in FIGS. 1 to 7, the third and fourth dummy electrodes may have the structure illustrated in FIGS. 11 to 13, and vice versa.

In addition, the first and second dummy electrodes may have the structure illustrated in FIGS. 8 to 10, the third and fourth dummy electrodes may have the structure illustrated in FIGS. 11 to 13, and vice versa.

While the embodiments of the present disclosure have been described above, the present disclosure is not limited thereto, and various modifications can be made and carried out within the scope of the claims, the detailed description of the present disclosure, and the accompanying drawings, and also fall within the scope of the present disclosure.

DESCRIPTION OF SYMBOLS

10: Multilayer ceramic capacitor
12: Ceramic main body
13: First external electrode
14: Second external electrode
150, 1150, 2150: First dummy electrode pattern
151, 1151, 2151: First dummy electrode
152, 1152, 2152: Second dummy electrode
160, 1160, 2160: Second dummy electrode pattern
161, 1161, 2161: Third dummy electrode
162, 1162, 2162: Fourth dummy electrode
121: Upper surface
122: Lower surface
A: Active area
M: Margin area
21, 22: Internal electrode
123: First cover layer
124: Dielectric layer
125: Second cover layer
126: First lateral surface
127: Second lateral surface
133: First junction portion
143: Second junction portion
135: First band portion
145: Second band portion
137, 147: Seed electrode layer
128: First end surface
129: Second end surface
173: First exposed surface
183: Second exposed surface
200: Circuit board
211, 213: First and second electrode pads
215: Conductive joining member

What is claimed is:

1. A multilayer ceramic capacitor comprising:
a ceramic main body having a thickness smaller than a width of the ceramic body, including:
first and second surfaces opposite to each other in a first direction;
third and fourth surfaces opposite to each other in a second direction;
fifth and sixth surfaces opposite to each other in a third direction;
a plurality of dielectric layers, a plurality of first internal electrodes;
a plurality of second internal electrodes stacked in the third direction;
a first external electrode disposed on the first surface of the ceramic main body and connected to the plurality of first internal electrodes;
a second external electrode disposed on the second surface of the ceramic main body and connected to the plurality of second internal electrodes;
a first cover layer including a first dummy electrode pattern adjoining to an internal electrode closest to the fifth surface among the plurality of first and second internal electrodes; and
a second cover layer including a second dummy electrode pattern and adjoining to an internal electrode closest to the sixth surface among the plurality of first and second internal electrodes,
wherein the second cover layer comprises a first exposed surface, which is a portion of the first surface on which the first external electrode is not disposed, and a second exposed surface, which is a portion of the second surface on which the second external electrode is not disposed,
wherein the second dummy electrode pattern comprises:
a third dummy electrode adjoining to the first exposed surface or extended to the first exposed surface; and
a fourth dummy electrode adjoining to the second exposed surface or extended to the second exposed surface.

2. The multilayer ceramic capacitor of claim 1, wherein:
the first dummy electrode pattern comprises:
a first dummy electrode adjoining to the first surface or be drawn out to the first surface; and
a second dummy electrode adjoining to the second surface or be drawn out to the second surface.

3. The multilayer ceramic capacitor of claim 2, wherein:
the ceramic main body comprises:
an active area in which the plurality of first internal electrodes and the plurality of second internal electrodes overlap one another in the third direction;
a first margin area between the active area and the first surface of the ceramic main body; and
a second margin area between the active area and the second surface of the ceramic main body, and
wherein a length L1 of the first dummy electrode is equal to or larger than a width L2 of the first margin area, and
wherein a length L1' of the second dummy electrode is equal to or larger than a width L2' of the second margin area.

4. The multilayer ceramic capacitor of claim 3, wherein:
the second dummy electrode pattern comprises:
a third dummy electrode adjoining to the first surface or be drawn out to the first surface; and
a fourth dummy electrode adjoining to the second surface or be drawn out to the second surface,
wherein a length L3 of the third dummy electrode is equal to or larger than a width L2 of the first margin area, and
wherein a length L3' of the fourth dummy electrode is equal to or larger than a width L2' of the second margin area.

5. The multilayer ceramic capacitor of claim 2, wherein
the third dummy electrode is spaced apart from the first exposed surface; and
the fourth dummy electrode is spaced apart from the second exposed surface.

6. The multilayer ceramic capacitor of claim 1, wherein:
the first dummy electrode pattern comprises:
a first dummy electrode spaced apart from the first surface; and
a second dummy electrode spaced apart from the second surface.

7. The multilayer ceramic capacitor of claim 6, wherein:
the second cover layer comprises a first exposed surface, which is a portion of the first surface on which the first external electrode is not disposed, and a second exposed surface, which is a portion of the second surface on which the second external electrode is not disposed, and
the second dummy electrode pattern comprises:
a third dummy electrode spaced apart from the first exposed surface; and
a fourth dummy electrode spaced apart from the second exposed surface.

8. The multilayer ceramic capacitor of claim 7, wherein:
a length L1 of the first dummy electrode is equal to or larger than a width L2 of the first margin area, and a length L1' of the second dummy electrode is equal to or larger than a width L2' of the second margin area.

9. The multilayer ceramic capacitor of claim 8, wherein:
a length L3 of the third dummy electrode is equal to or larger than the width L2 of the first margin area, and
a length L3' of the fourth dummy electrode is equal to or larger than the width L2' of the second margin area.

10. The multilayer ceramic capacitor of claim 6, wherein:
the second cover layer comprises a first exposed surface, which is a portion of the first surface exposed by the first external electrode, and a second exposed surface, which is a portion of the second surface exposed by the second external electrode, and
the second dummy electrode pattern comprises:
a third dummy electrode adjoining to the first exposed surface or be drawn out to the first exposed surface; and
a fourth dummy electrode adjoining to the second exposed surface or be drawn out to the second exposed surface.

11. The multilayer ceramic capacitor of claim 1, wherein:
the second cover layer comprises a first exposed surface, which is a portion of the first surface exposed by the first external electrode, and a second exposed surface, which is a portion of the second surface exposed by the second external electrode, and
wherein a height H1 of the first exposed surface is smaller than a thickness t of the second cover layer, and a height H2 of the second exposed surface is smaller than the thickness t of the second cover layer.

12. The multilayer ceramic capacitor of claim 1, wherein:
the first external electrode comprises a first band portion disposed on the fifth surface of the ceramic main body,
the second external electrode comprises a second band portion disposed on the fifth surface of the ceramic main body, and
the multilayer ceramic capacitor further comprises a first seed electrode layer disposed between the first band portion and the fifth surface, and a second seed electrode layer disposed between the second band portion and the fifth surface.

13. The multilayer ceramic capacitor of claim 12, wherein:
the first dummy electrode pattern comprises:
a first dummy electrode adjoining to the first surface or be drawn out to the first surface; and
a second dummy electrode adjoining to the second surface or be drawn out to the second surface,
a length L1 of the first dummy electrode is smaller than a length L4 of the first band portion, and
a length L1' of the second dummy electrode is smaller than a length L4' of the second band portion.

14. The multilayer ceramic capacitor of claim 13, wherein:
a length L3 of the third dummy electrode is smaller than a length L4 of the first band portion, and
a length L3' of the fourth dummy electrode is smaller than a length L4' of the second band portion.

15. The multilayer ceramic capacitor of claim 14, wherein:
the ceramic main body comprises:
an active area in which the plurality of first internal electrodes and the plurality of second internal electrodes overlap one another in the third direction;
a first margin area between the active area and the first surface of the ceramic main body; and
a second margin area between the active area and the second surface of the ceramic main body, and
wherein the length L1 of the first dummy electrode is equal to or larger than a width L2 of the first margin area, and
the length L1' of the second dummy electrode is equal to or larger than a width L2' of the second margin area.

16. The multilayer ceramic capacitor of claim 15, wherein:
the length L3 of the third dummy electrode is equal to or larger than the width L2 of the first margin area, and
the length L3' of the fourth dummy electrode is equal to or larger than the width L2' of the second margin area.

17. The multilayer ceramic capacitor of claim 4, wherein:
multilayer ceramic capacitor comprises:
more than one of the first dummy electrode,
more than one of the second dummy electrode,
more than one of the third dummy electrode, or
more than one of the fourth dummy electrode.

18. The multilayer ceramic capacitor of claim 1, wherein:
the ceramic main body comprises:
an active area in which the plurality of first internal electrodes and the plurality of second internal electrodes overlap one another in the third direction;
a first margin area between the active area and the first surface of the ceramic main body; and
a second margin area between the active area and the second surface of the ceramic main body, and
wherein a sum S1 of thicknesses of the plurality of first internal electrodes and the plurality of second internal electrodes in the active area is larger than 0 and equal to or smaller than twice a sum S2 of thicknesses of the first dummy electrode pattern and the second dummy electrode pattern.

19. The multilayer ceramic capacitor of claim 1, wherein:
the thickness of the ceramic main body is larger than 0 and equal to or smaller than 80% of the width of the ceramic body.

20. The multilayer ceramic capacitor of claim 1, wherein:
each of the plurality of first internal electrodes and the plurality of second internal electrodes has a rectangular shape including first and second long sides facing each other and first and second short sides facing each other when viewed in the third direction,
the first short side of the first internal electrode is connected to the first external electrode, and the first short side of the second internal electrode is connected to the second external electrode.

21. The multilayer ceramic capacitor of claim 1, wherein:
each of the plurality of first internal electrodes and the plurality of second internal electrodes has a rectangular shape including first and second long sides facing each other and first and second short sides facing each other when viewed in the third direction,
the first long side of the first internal electrode is connected to the first external electrode, and the first long side of the second internal electrode is connected to the second external electrode.

* * * * *